(12) United States Patent
Tavčar et al.

(10) Patent No.: US 11,165,246 B2
(45) Date of Patent: *Nov. 2, 2021

(54) OVERVOLTAGE PROTECTION DEVICE INCLUDING MULTIPLE VARISTOR WAFERS

(71) Applicant: RIPD Research and IP Development Ltd., Nicosia (CY)

(72) Inventors: Tine Tavčar, Skofljica (SI); Saša Rustja, Ljubljana (SI); Alexis Chorozoglou, Drama (SI); George Peppas, Drama (GR); Fotis Xepapas, Drama (GR); Zafiris G. Politis, Athens (GR)

(73) Assignee: RIPD Research and IP Development Ltd., Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,310

(22) Filed: May 27, 2020

(65) Prior Publication Data

US 2020/0295562 A1    Sep. 17, 2020

Related U.S. Application Data

(63) Continuation of application No. 15/795,986, filed on Oct. 27, 2017, now Pat. No. 10,707,678, which is a
(Continued)

(51) Int. Cl.
*H02H 9/00* (2006.01)
*H02H 9/04* (2006.01)
*H01C 7/12* (2006.01)

(52) U.S. Cl.
CPC ............... *H02H 9/04* (2013.01); *H01C 7/12* (2013.01); *H02H 9/044* (2013.01)

(58) Field of Classification Search
None
See application file for complete search history.

(56) References Cited

U.S. PATENT DOCUMENTS

| 1,144,029 | A | 6/1915 | Creighton |
| 2,158,859 | A | 5/1939 | Horikoshi |

(Continued)

FOREIGN PATENT DOCUMENTS

| CA | 2098365 | 12/1993 |
| CH | 466427 | 12/1968 |

(Continued)

OTHER PUBLICATIONS

Beitz et al. "Dubbel Taschenbuch für den Maschinenbau" (3 pages) (1997).
(Continued)

*Primary Examiner* — Stephen W Jackson
(74) *Attorney, Agent, or Firm* — Myers Bigel, P.A.

(57) ABSTRACT

An overvoltage protection device includes a first electrode member, a second electrode member, and a varistor assembly. The varistor assembly includes: a plurality of varistor wafers each formed of a varistor material; and at least one electrically conductive interconnect member connecting the varistor wafers in electrical parallel between the first and second electrode members. The varistor wafers are axially stacked between the first and second electrodes.

20 Claims, 19 Drawing Sheets

Related U.S. Application Data continuation-in-part of application No. 15/389,870, filed on Dec. 23, 2016, now Pat. No. 10,447,026.

(56) References Cited

U.S. PATENT DOCUMENTS

| | | |
|---|---|---|
| 2,311,758 A | 2/1943 | Johansson |
| 2,971,132 A | 2/1961 | Nash |
| 3,249,719 A | 5/1966 | Misare et al. |
| 3,375,405 A | 3/1968 | Fallon et al. |
| 3,522,570 A | 8/1970 | Oley |
| 3,711,794 A | 1/1973 | Tasca et al. |
| 3,813,577 A | 5/1974 | Kawiecke |
| 3,863,111 A | 1/1975 | Martzloff |
| 4,015,228 A | 3/1977 | Eda et al. |
| 4,023,133 A | 5/1977 | Knapp, Jr. |
| 4,085,397 A | 4/1978 | Yagher, Jr. |
| 4,092,694 A | 5/1978 | Stetson |
| 4,217,618 A | 8/1980 | Boney et al. |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |
| 4,355,345 A | 10/1982 | Franchet |
| 4,425,017 A | 1/1984 | Chan |
| 4,493,003 A | 1/1985 | Mickelson et al. |
| 4,595,635 A | 6/1986 | Dubrow et al. |
| 4,600,261 A | 7/1986 | Debbaut |
| 4,638,284 A | 1/1987 | Levinson |
| 4,701,574 A | 10/1987 | Shimirak et al. |
| 4,906,963 A | 3/1990 | Ackermann et al. |
| 4,908,730 A | 3/1990 | Westrom |
| 4,956,696 A | 9/1990 | Hoppe et al. |
| 5,006,950 A | 4/1991 | Allina |
| 5,130,884 A | 7/1992 | Allina |
| 5,172,296 A | 12/1992 | Kaczmarek |
| 5,311,164 A | 5/1994 | Ikeda et al. |
| 5,519,564 A | 5/1996 | Carpenter, Jr. |
| 5,523,916 A | 6/1996 | Kaczmarek |
| 5,529,508 A | 6/1996 | Chiotis et al. |
| 5,588,856 A | 12/1996 | Collins et al. |
| 5,621,599 A | 4/1997 | Larsen et al. |
| 5,652,690 A | 7/1997 | Mansfield et al. |
| 5,721,664 A | 2/1998 | Uken et al. |
| 5,724,221 A | 3/1998 | Law |
| 5,781,394 A | 7/1998 | Lorenz et al. |
| 5,808,850 A | 9/1998 | Carpenter, Jr. |
| 5,936,824 A | 8/1999 | Carpenter, Jr. |
| 5,982,597 A * | 11/1999 | Webb .............. H01C 7/108 361/103 |
| 6,038,119 A | 3/2000 | Atkins et al. |
| 6,094,128 A | 7/2000 | Bennett et al. |
| 6,172,865 B1 | 1/2001 | Boy et al. |
| 6,175,480 B1 | 1/2001 | Karmazyn |
| 6,222,433 B1 | 4/2001 | Ramakrishnan et al. |
| 6,226,166 B1 | 5/2001 | Gumley et al. |
| 6,430,019 B1 | 8/2002 | Martenson et al. |
| 6,430,020 B1 | 8/2002 | Atkins et al. |
| 6,459,559 B1 | 10/2002 | Christofersen |
| 6,556,402 B2 | 4/2003 | Kizis et al. |
| 6,614,640 B2 | 9/2003 | Richter et al. |
| 6,930,871 B2 | 8/2005 | Macanda |
| 7,433,169 B2 * | 10/2008 | Kamel .............. H01C 7/12 361/127 |
| 7,558,041 B2 | 7/2009 | Lagnoux |
| 7,684,166 B2 | 3/2010 | Donati et al. |
| 7,738,231 B2 | 6/2010 | Lagnoux |
| 8,659,866 B2 | 2/2014 | Douglass et al. |
| 8,743,525 B2 * | 6/2014 | Xepapas .............. H01C 8/04 361/117 |
| 8,766,762 B2 | 7/2014 | Depping et al. |
| 9,349,548 B2 | 5/2016 | Juricev |
| 9,634,554 B2 | 4/2017 | Falk et al. |
| 9,750,122 B1 | 8/2017 | Elizondo-Decanini |
| 9,906,017 B2 | 2/2018 | Tsovilis et al. |
| 10,447,026 B2 | 10/2019 | Kostakis et al. |
| 10,707,678 B2 * | 7/2020 | Tavčar .............. H01C 7/12 |
| 2002/0018331 A1 | 2/2002 | Takahashi |
| 2003/0184926 A1 | 10/2003 | Wu et al. |
| 2004/0150937 A1 | 8/2004 | Bobert et al. |
| 2005/0231872 A1 | 10/2005 | Schimanski et al. |
| 2006/0291127 A1 | 12/2006 | Kim et al. |
| 2007/0217106 A1 | 9/2007 | Lagnoux |
| 2008/0043395 A1 | 2/2008 | Donati et al. |
| 2008/0049370 A1 | 2/2008 | Adachi et al. |
| 2011/0193674 A1 | 8/2011 | Zaeuner et al. |
| 2011/0248816 A1 | 10/2011 | Duval et al. |
| 2012/0050935 A1 | 3/2012 | Douglass et al. |
| 2012/0086539 A1 | 4/2012 | Duval et al. |
| 2012/0086540 A1 | 4/2012 | Duval et al. |
| 2012/0250205 A1 | 10/2012 | Pfitzer et al. |
| 2013/0038976 A1 | 2/2013 | Hagerty |
| 2013/0200986 A1 | 8/2013 | Koprivsek |
| 2013/0265685 A1 | 10/2013 | Zäuner et al. |
| 2013/0335869 A1 | 12/2013 | Xepapas et al. |
| 2014/0010704 A1 | 1/2014 | Ishida et al. |
| 2014/0092514 A1 | 4/2014 | Chen |
| 2014/0327990 A1 | 11/2014 | Juricev |
| 2015/0103462 A1 | 4/2015 | Depping |
| 2015/0107972 A1 | 4/2015 | Oh |
| 2015/0270086 A1 | 9/2015 | Chen |
| 2015/0280420 A1 | 10/2015 | Mao |
| 2015/0349523 A1 | 12/2015 | Tsovilis et al. |
| 2016/0087520 A1 | 3/2016 | Falk et al. |
| 2016/0276821 A1 | 9/2016 | Politis et al. |
| 2017/0311462 A1 | 10/2017 | Kamensek et al. |
| 2018/0138698 A1 | 5/2018 | Tsovilis et al. |
| 2018/0151318 A1 | 5/2018 | Kamensek et al. |
| 2018/0183230 A1 | 6/2018 | Kostakis et al. |
| 2018/0183232 A1 | 6/2018 | Tavcar et al. |
| 2018/0330908 A1 | 11/2018 | Vrhunc et al. |
| 2019/0080826 A1 | 3/2019 | Kamensek et al. |

FOREIGN PATENT DOCUMENTS

| | | |
|---|---|---|
| DE | 3428258 | 2/1986 |
| DE | 4235329 | 4/1994 |
| DE | 4438593 | 5/1996 |
| DE | 19823446 | 11/1999 |
| DE | 19839422 | 3/2000 |
| DE | 19843519 | 4/2000 |
| DE | 202004006227 | 10/2004 |
| DE | 10323220 | 12/2004 |
| DE | 102006003274 | 1/2008 |
| DE | 202008004699 | 6/2008 |
| DE | 102007014336 | 10/2008 |
| DE | 102008017423 | 10/2009 |
| DE | 102008026555 | 12/2009 |
| DE | 102009004704 | 3/2010 |
| DE | 102013021936 | 2/2012 |
| DE | 102012004678 | 9/2013 |
| DE | 202006021210 | 9/2013 |
| DE | 102013103753 | 10/2013 |
| DE | 102013011216 | 10/2014 |
| DE | 102013107807 | 1/2015 |
| DE | 102014016938 | 2/2016 |
| DE | 102014016830 | 9/2016 |
| EP | 0108518 | 5/1984 |
| EP | 020337 | 12/1986 |
| EP | 0335479 | 10/1989 |
| EP | 0445054 | 9/1991 |
| EP | 0462694 | 12/1991 |
| EP | 0516416 | 12/1992 |
| EP | 0603428 | 6/1994 |
| EP | 0785625 | 7/1997 |
| EP | 0963590 | 12/1999 |
| EP | 1094550 | 4/2001 |
| EP | 1102371 | 5/2001 |
| EP | 1116246 | 7/2001 |
| EP | 1355327 | 10/2003 |
| EP | 1458072 | 9/2004 |
| EP | 1798742 | 6/2007 |
| EP | 2075811 | 7/2009 |
| EP | 2707892 | 3/2014 |

(56) References Cited

FOREIGN PATENT DOCUMENTS

| | | |
|---|---|---|
| EP | 2725588 | 4/2014 |
| EP | 3001525 | 3/2016 |
| EP | 3240132 | 11/2017 |
| FR | 2574589 | 6/1986 |
| FR | 2622047 | 4/1989 |
| FR | 2897231 | 8/2007 |
| JP | 60-187002 | 9/1985 |
| JP | 60-226103 | 11/1985 |
| JP | 60-258905 | 12/1985 |
| JP | 61-198701 | 9/1986 |
| JP | 1-176687 | 7/1989 |
| JP | H05176445 | 7/1993 |
| JP | 09-326546 | 12/1997 |
| JP | 2002-525861 | 8/2002 |
| JP | 2002-525862 | 8/2002 |
| JP | 5493065 | 5/2014 |
| SI | 9700277 | 4/1999 |
| SI | 9700332 | 6/1999 |
| SI | 20781 | 6/2002 |
| SI | 20782 | 6/2002 |
| SI | 22030 | 10/2006 |
| SI | 23303 | 8/2011 |
| SI | 23749 | 11/2012 |
| SI | 24371 | 11/2014 |
| WO | 88/00603 | 1/1988 |
| WO | 90/05401 | 5/1990 |
| WO | 95/15600 | 6/1995 |
| WO | 95/24756 | 9/1995 |
| WO | 97/42693 | 11/1997 |
| WO | 98/38653 | 9/1998 |
| WO | 00/17892 | 3/2000 |
| WO | 2007/117163 | 10/2007 |
| WO | 2008/009507 | 1/2008 |
| WO | 2008/104824 | 9/2008 |
| WO | 2011/102811 | 8/2011 |
| WO | 2012/026888 | 3/2012 |
| WO | 2012/154134 | 11/2012 |
| WO | 2013/044961 | 4/2013 |
| WO | 2016/101776 | 6/2016 |
| WO | 2016/110360 | 7/2016 |

OTHER PUBLICATIONS

Data Book Library 1997 Passive Components, Siemens Matsushita Components (pp. 15-17, 26-32, 36-37, 39, 161, 166, 167, 169, 171-174) (1997).
DuPont 4300 Series Resistors Technical Data Sheet (3 pages) (May 2013).
Extended European Search Report corresponding to European Application No. 18190872.4 (14 pages) (Jun. 24, 2019).
FormexTM GK/Formex Product Data Flame Retardant Polypropylene Sheet, ITW Formex (4 pages) (2002).
Oberg et al. "Machinery's Handbook 27th Edition—Soldering and Brazing" (4 pages) (2004).
Partial European Search Report corresponding to European Application No. 18190872.4 (14 pages) (Apr. 3, 2019).
Raycap "RayvossTM Transient Voltage Surge Suppression System" webpage, http://www.raycap.com/surge/rayvoss.htm accessed on Nov. 29, 2005 (1 page) (Date Unknown; Admitted Prior Art).
Raycap "Revolutionary Lightning Protection Technology" Raycap Corporation Press Release, webpage, http://www.raycap.com/news/020930.htm accessed on Nov. 29, 2005 (1 page) (Date Unknown; Admitted Prior Art).
Raycap "The Ultimate Overvoltage Protection: RayvossTM" brochure (4 pages) (Date Unknown; Admitted Prior Art).
Raycap "Strikesorb® 30 Series OEM Surge Suppression Solutions" brochure (2 pages) (Apr. 17, 2009).
Raycap "The Next Generation Surge Protection Rayvoss™" brochure (4 pages) (May 4, 2012).
Raycap "The Ultimate Overvoltage Protection Rayvoss™" brochure (4 pages) (2005).
Raycap "The Ultimate Overvoltage Protection Rayvoss™" brochure (4 pages) (Jan. 2009).
RayvossTM "The Ultimate Overvoltage Protection" webpage, http://www.rayvoss.com accessed on Nov. 29, 2005 (2 pages) (Date Unknown; Admitted Prior Art).
RayvossTM "Applications" webpage http://www.rayvoss.com/applications.htm accessed on Nov. 29, 2005 (4 pages) (Date Unknown; Admitted Prior Art).
RayvossTM "Frequently Asked Questions" webpage, http://www.rayvoss.com/faq.htm accessed on Nov. 29, 2005 (2 pages) (Date Unknown; Admitted Prior Art).
RayvossTM "Technical Information" webpage, http://www.rayvoss.com/tech_info.htm accessed on Nov. 29, 2005 (3 pages) (Date Unknown; Admitted Prior Art).
Translation of DIN-Standards, Built-In Equipment for Electrical Installations; Overall Dimensions and Related Mounting Dimensions (15 pages) (Dec. 1988).
VAL-MS-T1/T2 335/12.5/3+1, Extract from the online catalog, Phoenix Contact GmbH & Co. KG http://catalog.phoenixcontact.net/phoenix/treeViewClick.do?UID=2800184 (7 pages) (May 22, 2014).

* cited by examiner

US 11,165,246 B2

OVERVOLTAGE PROTECTION DEVICE INCLUDING MULTIPLE VARISTOR WAFERS

RELATED APPLICATION(S)

The present application is a continuation of and claims priority from U.S. patent application Ser. No. 15/795,986, filed on Oct. 27, 2017, which is a continuation-in-part of and claims priority from U.S. patent application Ser. No. 15/389,870, filed on Dec. 23, 2016, now U.S. Pat. No. 10,447,026, the entire contents of which are incorporated by reference herein.

FIELD OF THE INVENTION

The present invention relates to circuit protection devices and, more particularly, to overvoltage protection devices and methods.

BACKGROUND

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges and resulting down time may be very costly.

Typically, sensitive electronic equipment may be protected against transient overvoltages and surge currents using Surge Protective Devices (SPDs). For example, brief reference is made to FIG. 1, which is a system including conventional overvoltage and surge protection. An overvoltage protection device 12 may be installed at a power input of equipment to be protected 50, which is typically protected against overcurrents when it fails. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance. In this manner, the device can withstand significant short circuit currents. In this regard, there may be no operational need for an internal thermal disconnector. Further to the above, some embodiments that exhibit even higher short circuit withstand capabilities may also be protected only by the main circuit breaker of the installation without the need for a dedicated branch fuse.

Brief reference is now made to FIG. 2, which is a block diagram of a system including conventional surge protection. As illustrated, a three phase line may be connected to and supply electrical energy to one or more transformers 66, which may in turn supply three phase electrical power to a main circuit breaker 68. The three phase electrical power may be provided to one or more distribution panels 62. As illustrated, the three voltage lines of the three phase electrical power may designated as L1, L2 and L3 and a neutral line may be designated as N. In some embodiments, the neutral line N may be conductively coupled to an earth ground.

Some embodiments include surge protective devices (SPDs) 15. As illustrated, each of the SPDs 15 may be connected between respective ones of L1, L2 and L3, and neutral (N). The SPD 15 may protect other equipment in the installation such as the distribution panel among others. In addition, the SPDs may be used to protect all equipment in case of prolonged overvoltages. However, such a condition may force the SPD to conduct a limited current for a prolonged period of time, which may result in the overheating of the SPD and possibly its failure (depending on the energy withstand capabilities the SPD can absorb and the level and duration of the overvoltage condition). A typical operating voltage of an SPD 15 in the present example may be about 400V (for 690V L-L systems). In this regard, the SPDs 15 will each perform as an insulator and thus not conduct current during normal operating conditions. In some embodiments, the operating voltage of the SPD's 15 is sufficiently higher than the normal line-to-neutral voltage to ensure that the SPD 15 will continue to perform as an insulator even in cases in which the system voltage increases due to overvoltage conditions that might arise as a result of a loss of neutral or other power system issues.

In the event of a surge current in, for example, L1, protection of power system load devices may necessitate providing a current path to ground for the excess current of the surge current. The surge current may generate a transient overvoltage between L1 and N. Since the transient overvoltage significantly exceeds that operating voltage of SPD 15, the SPD 15 will become conductive, allowing the excess current to flow from L1 through SPD 15 to the neutral N. Once the surge current has been conducted to N, the overvoltage condition ends and the SPD 15 may become non-conducting again. However, in some cases, one or more SPD's 15 may begin to allow a leakage current to be conducted even at voltages that are lower that the operating voltage of the SPD's 15. Such conditions may occur in the case of an SPD deteriorating.

As provided above, devices for protecting equipment from excess voltage or current spikes (transient overvoltages and surge currents) may include including varistors (for example, metal oxide varistors (MOVs) and/or silicon carbide varistors).

SUMMARY

According to embodiments of the invention, an overvoltage protection device includes a first electrode member, a second electrode member, and a varistor assembly. The varistor assembly includes: a plurality of varistor wafers each formed of a varistor material; and at least one electrically conductive interconnect member connecting the varistor wafers in electrical parallel between the first and second electrode members. The varistor wafers are axially stacked between the first and second electrodes.

According to some embodiments, the plurality of varistor wafers includes first, second and third varistor wafers, and the at least one interconnect member includes at least first and second interconnect members connecting the varistor wafers in electrical parallel between the first and second electrode members.

In some embodiments, the first interconnect member contacts and electrically connects each of the first electrode member and the first, second and third varistor wafers, and the second interconnect member contacts and electrically connects each of the second electrode member and the first, second and third varistor wafers.

In some embodiments, each of the first, second and third varistor wafers includes opposed planar contact faces, each of the first and second interconnect members includes two spaced apart, planar contact portions and a bridge portion extending between and electrically connecting the contact portions, and the contact portions engage the planar contact faces.

In some embodiments, each contact portion engages at least 40 percent of each contact face engaged thereby.

According to some embodiments, each varistor wafer has a thickness in the range of from about 0.5 mm to 15 mm.

According to some embodiments, each varistor wafer includes metallization layers forming opposed planar contact faces of the varistor wafer.

According to some embodiments, the overvoltage protection device includes a bonding agent bonding at least two of the varistor wafers in the varistor assembly to one another. In some embodiments, the bonding agent is at least one of cyanoacrylate-based adhesive and epoxy-based adhesive. In some embodiments, the bonding agent is bonded to peripheral edges of the varistor wafers. In some embodiments, the bonding agent includes a plurality of circumferentially spaced apart bonding agent masses bonded to the peripheral edges of the varistor wafers.

According to some embodiments, the first electrode includes a housing electrode including an end wall and an integral sidewall collectively defining a cavity, the second electrode extends into the cavity, and the varistor assembly is disposed in the cavity. In some embodiments, the housing electrode is unitarily formed of metal. In some embodiments, the overvoltage protection device includes a biasing device applying an axially compressive load to the varistor assembly.

According to some embodiments, the overvoltage protection device includes a biasing device applying an axially compressive load to the varistor assembly.

According to some embodiments, the overvoltage protection device includes an electrically conductive meltable member, wherein the meltable member is responsive to heat in the overvoltage protection device to melt and form an electrical short circuit path across the first and second electrode members.

In some embodiments, the overvoltage protection device includes a void filling member surrounding at least a portion of the varistor assembly, wherein the void filling member is formed of an electrically insulating material.

In some embodiments, the void filling member includes a receiver recess and a portion of the interconnect member extends outwardly beyond the plurality of varistors and is disposed in the receiver recess.

According to some embodiments, the first electrode includes a housing electrode including an end wall and an integral sidewall collectively defining a chamber, the chamber includes a first subchamber and a second subchamber in fluid communication with the first subchamber, the meltable member is disposed in the first subchamber, the varistor assembly is disposed in the second subchamber and a gap volume is defined between the varistor assembly and the sidewall; and the void filling member is disposed in the gap volume to limit a flow of the meltable member into the gap volume.

In some embodiments, the void filling member occupies at least 50 percent of the gap volume.

According to some embodiments, the varistor assembly includes an insulator wafer axially interposed and stacked between at least two of the plurality of varistor wafers.

According to some embodiments, the first electrode is a unitary housing electrode, the housing electrode includes first and second cavities, the varistor assembly is disposed in the first cavity, and the overvoltage protection device further includes a second varistor assembly and a third electrode member. The second varistor assembly is disposed in the second cavity. The second varistor assembly includes: a plurality of varistor wafers each formed of a varistor material; and at least one electrically conductive interconnect member. The varistor wafers of the second varistor assembly are axially stacked between the housing electrode and the third electrode. The at least one interconnect member of the second varistor assembly connects the varistor wafers of the second varistor assembly in electrical parallel between the housing electrode and the third electrode.

According to further embodiments, a varistor assembly includes: a plurality of varistor wafers each formed of a varistor material; at least one electrically conductive interconnect member connecting the varistor wafers in electrical parallel; and a bonding agent bonding at least two of the varistor wafers in the varistor assembly to one another. The varistor wafers and the at least one interconnect member are axially stacked.

In some embodiments, the bonding agent is at least one of cyanoacrylate-based adhesive and epoxy-based adhesive.

In some embodiments, the bonding agent is bonded to peripheral edges of the varistor wafers.

In some embodiments, the bonding agent includes a plurality of circumferentially spaced apart bonding agent masses bonded to the peripheral edges of the varistor wafers.

According to method embodiments of the invention, a method for forming a varistor assembly includes: providing a plurality of varistor wafers each formed of a varistor material; providing at least one electrically conductive interconnect member; axially stacking the varistor wafers and the at least one interconnect member such that the at least one interconnect member connects the varistor wafers in electrical parallel; thereafter applying an axial load to the varistor wafers and the at least one interconnect member; and thereafter bonding at least two of the varistor wafers in the varistor assembly to one another using a bonding agent.

According to further embodiments, an overvoltage protection device includes a first electrode member, a second electrode member, a varistor, an electrically conductive meltable member, and a void filling member. The varistor is interposed between and electrically connected to each of the first and second electrodes. The meltable member is responsive to heat in the overvoltage protection device to melt and form an electrical short circuit path across the first and second electrode members. The void filling member surrounds at least a portion of the varistor. The void filling member is formed of an electrically insulating material. The overvoltage protection device includes a sidewall defining a chamber, the chamber including a first subchamber and a second subchamber in fluid communication with the first subchamber. The meltable member is disposed in the first subchamber. The varistor assembly is disposed in the second subchamber and a gap volume is defined between the varistor assembly and the sidewall. The void filling member is disposed in the gap volume to limit a flow of the meltable member into the gap volume.

In some embodiments, the void filling member occupies at least 50 percent of the gap volume.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DRAWING DESCRIPTION

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION OF EMBODIMENTS OF THE INVENTION

Figure 1:
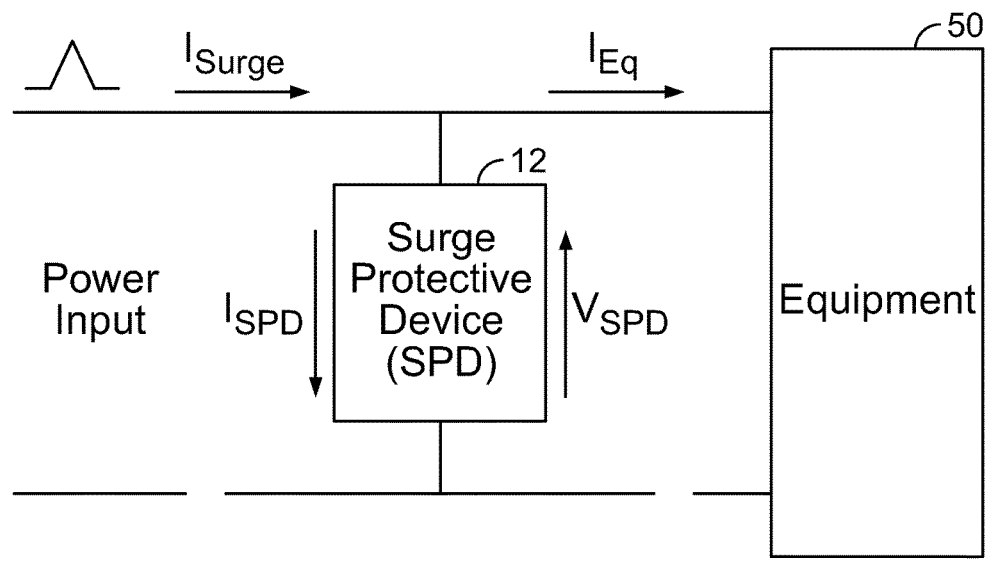
FIG. 1 is a block diagram of a system including conventional surge protection.
Figure 2:
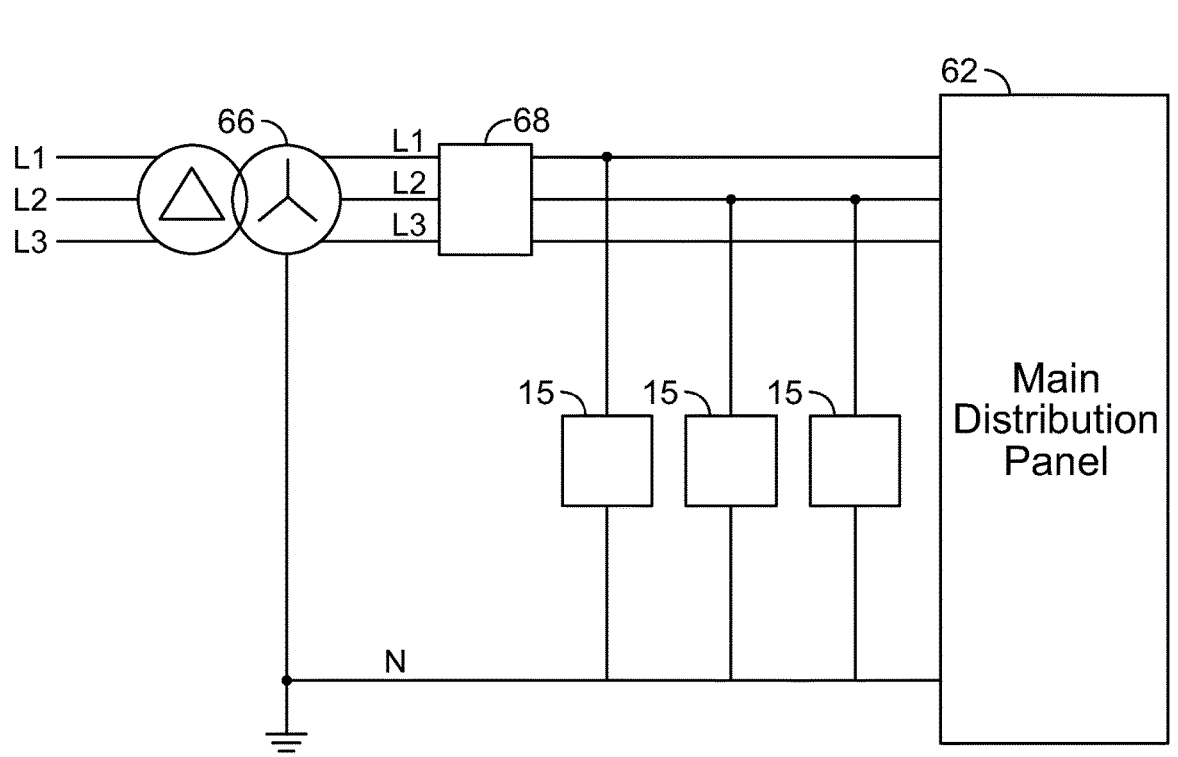
FIG. 2 is a block diagram of a system including conventional surge protection.
Figure 3:
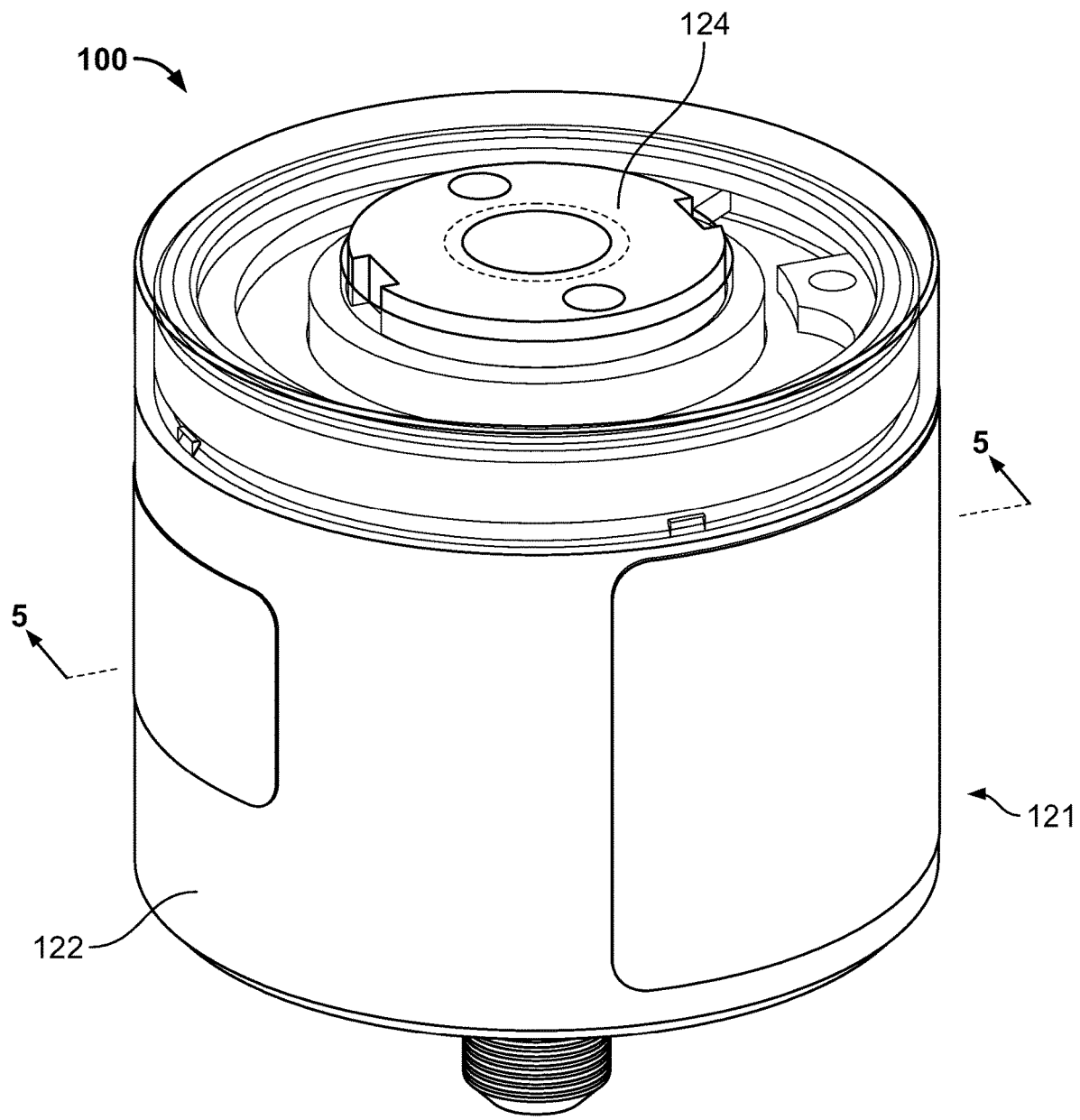
FIG. 3 is a perspective view of an overvoltage protection device according to some embodiments of the invention.
Figure 4:
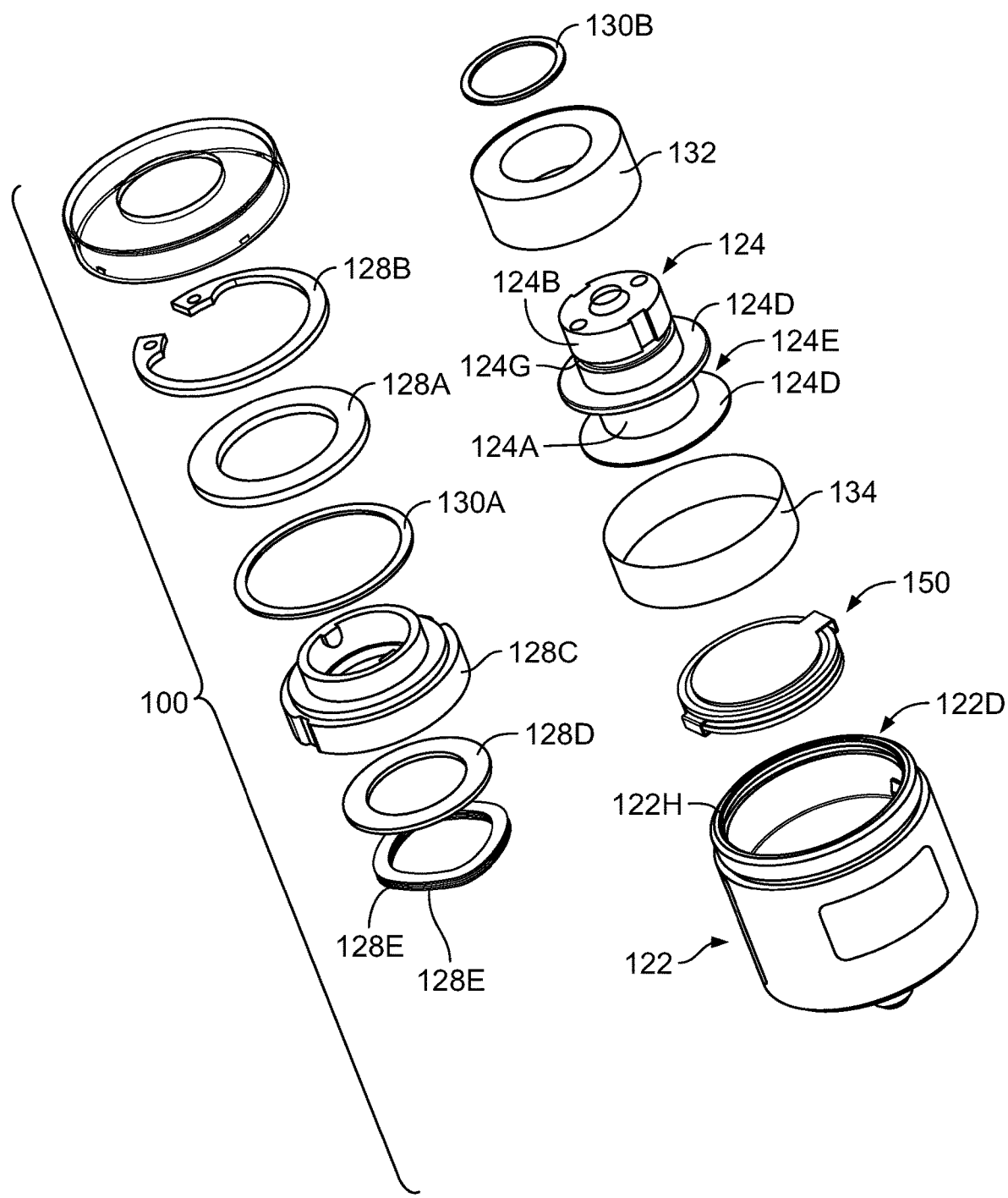
FIG. 4 is an exploded, perspective view of the overvoltage protection device of FIG. 3.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

As used herein, the term "wafer" means a substrate having a thickness which is relatively small compared to its diameter, length or width dimensions.

With reference to FIGS. 1-9, a modular surge protective device (SPD) or overvoltage protection device according to embodiments of the present invention is shown therein and designated 100. In accordance with some embodiments, the overvoltage protection device 100 is used as an SPD in an electrical circuit as discussed above. For example, overvoltage protection devices 100 may be used in place of the SPD 12 in the system of FIG. 1 or in place of the SPDs 15 in the system of FIG. 2.

Figure 5:
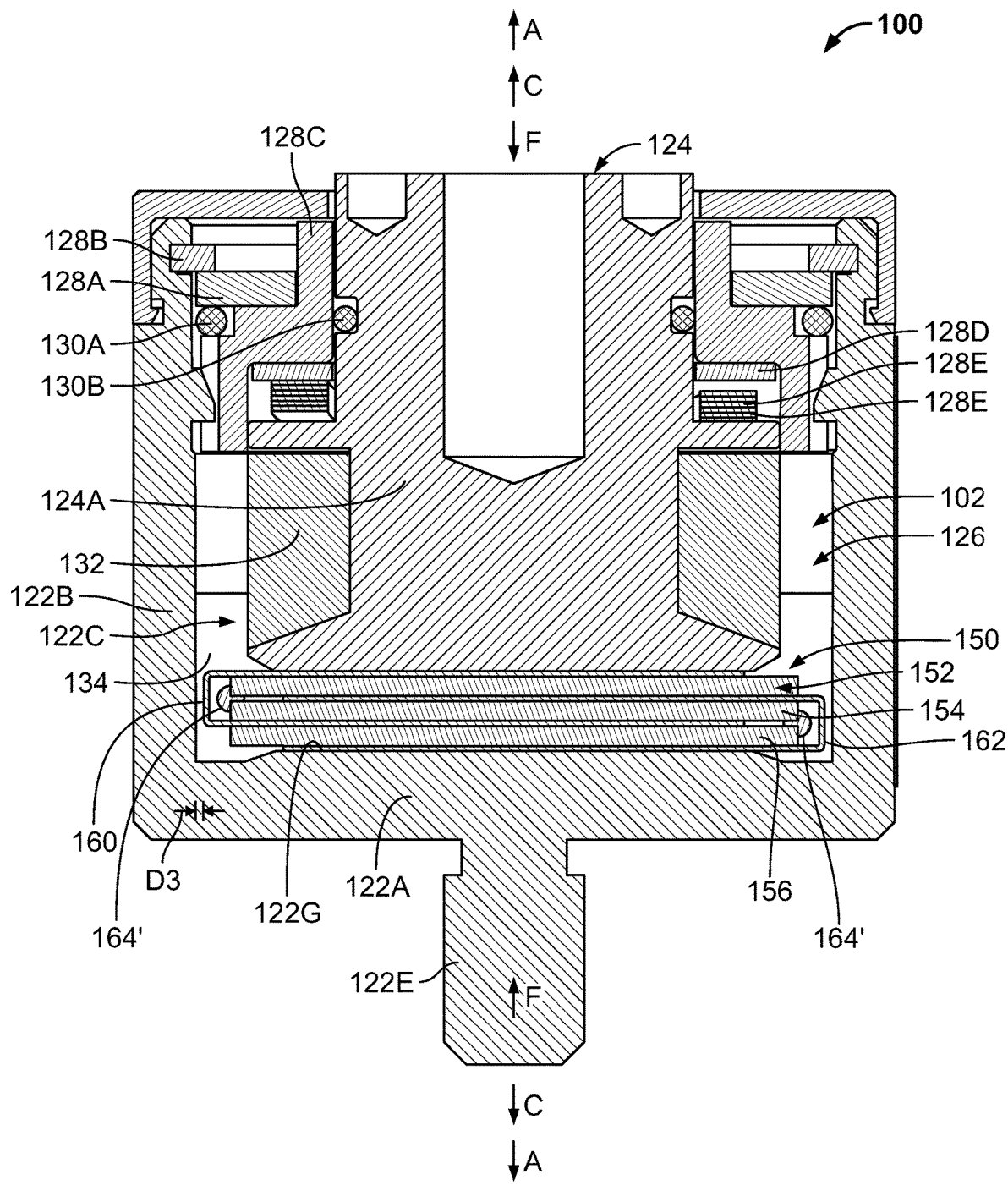
FIG. 5 is a cross-sectional view of the overvoltage protection device of FIG. 3 taken along the line 5-5 of FIG. 3.

The overvoltage protection device 100 is configured as a unit or module having a lengthwise axis A-A (FIG. 5). The overvoltage protection device 100 includes a first electrode or housing 122, a piston-shaped second electrode 124, four spring washers 128E, a flat washer 128D, an insulating ring member 128C, two O-rings 130A, 130B, an end cap 128A, a retention clip 128B, a meltable member 132, and an insulator sleeve 134.

The overvoltage protection device 100 further includes a varistor assembly 150 according to embodiments of the present invention. The varistor assembly 150 includes a first varistor member 152, a second varistor member 154, a third varistor wafer 156, a first internal interconnect member 160, a second internal interconnect member 162, and a bonding agent 164.

The overvoltage protection device 100 may further include an integral fail-safe mechanism, arrangement, feature or system 102. The fail-safe system 102 is adapted to prevent or inhibit overheating or thermal runaway of the overvoltage protection device, as discussed in more detail below.

The components 122, 124, 128A-C collectively form a housing assembly 121 defining a sealed, enclosed chamber 126. The components 122, 124, 128A-E, 132 and 150 are disposed axially between the housing 122 and the electrode 124 along the lengthwise axis A-A, in the enclosed chamber 126.

The housing 122 has an end electrode wall 122A and an integral cylindrical sidewall 122B extending from the electrode wall 122A. The sidewall 122B and the electrode wall 122A form a chamber or cavity 122C communicating with an opening 122D. A threaded post 122E projects axially outwardly from the electrode wall 122A.

The electrode wall 122A has an inwardly facing, substantially planar contact surface 122G. An annular clip slot 122I1 is formed in the inner surface of the sidewall 122B. According to some embodiments, the housing 122 is formed of aluminum. However, any suitable electrically conductive metal may be used. According to some embodiments, the housing 122 is unitary and, in some embodiments, monolithic. The housing 122 as illustrated is cylindrically shaped, but may be shaped differently.

The inner electrode 124 has a head 124A disposed in the cavity 122C and an integral shaft 122B that projects outwardly through the opening 122D.

The head 124A has a substantially planar contact surface 124C that faces the contact surface 122G of the electrode wall 122A. A pair of integral, annular, axially spaced apart flanges 124D extend radially outwardly from the shaft 124B and define an annular, sidewardly opening groove 124E therebetween. A threaded bore 124F is formed in the end of the shaft 124B to receive a bolt for securing the electrode 124 to a busbar, for example. An annular, sidewardly opening groove 124G is defined in the shaft 124B.

According to some embodiments, the electrode 124 is formed of aluminum. However, any suitable electrically conductive metal may be used. According to some embodiments, the electrode 124 is unitary and, in some embodiments, monolithic.

The electrodes 122, 124, the insulating ring 128C and the end cap 128A collectively define an enclosed chamber 126 containing the meltable member 132 and the varistor assembly 150.

An annular gap is defined radially between the head 124A and the nearest adjacent surface of the sidewall 122B. According to some embodiments, the gap has a radial width in the range of from about 1 to 15 mm.

The meltable member 132 is annular and is mounted on the electrode 124 in the groove 124E. The meltable member 132 is spaced apart from the sidewall 122B a distance sufficient to electrically isolate the meltable member 132 from the sidewall 122B.

The meltable member 132 is formed of a heat-meltable, electrically conductive material. According to some embodiments, the meltable member 132 is formed of metal. According to some embodiments, the meltable member 132 is formed of an electrically conductive metal alloy. According to some embodiments, the meltable member 132 is formed of a metal alloy from the group consisting of aluminum alloy, zinc alloy, and/or tin alloy. However, any suitable electrically conductive metal may be used.

According to some embodiments, the meltable member 132 is selected such that its melting point is greater than a prescribed maximum standard operating temperature. The maximum standard operating temperature may be the greatest temperature expected in the meltable member 132 during normal operation (including handling overvoltage surges within the designed for range of the system) but not during operation which, if left unchecked, would result in thermal runaway. According to some embodiments, the meltable member 132 is formed of a material having a melting point in the range of from about 80 to 160° C. and, according to some embodiments, in the range of from about 130 to 150° C. According to some embodiments, the melting point of the meltable member 132 is at least 20° C. less than the melting points of the housing 122 and the electrode 124 and, according to some embodiments, at least 40° C. less than the melting points of those components.

According to some embodiments, the meltable member 132 has an electrical conductivity in the range of from about $0.5 \times 10^6$ Siemens/meter (S/m) to $4 \times 10^7$ S/m and, according to some embodiments, in the range of from about $1 \times 10^6$ S/m to $3 \times 10^6$ S/m.

The three varistor wafers 152, 154, 156 and the two interconnect members 160, 162 are axially stacked in the chamber 126 between the electrode head 124 and the electrode wall 122 and form the varistor assembly 150. The interconnect members 160, 162 electrically interconnect the wafers 152, 154, 156 and the electrodes 122, 124 in the manner represented in the schematic electrical diagram of FIG. 9.

According to some embodiments, each varistor wafer 152, 154, 156 is a varistor wafer (i.e., is wafer- or disk-shaped). In some embodiments, each varistor wafer 152, 154, 156 is circular in shape and has a substantially uniform thickness. However, varistor wafers 152, 154, 156 may be formed in other shapes. The thickness and the diameter of the varistor wafers 152, 154, 156 will depend on the varistor characteristics desired for the particular application.

In some embodiments, each varistor wafer 152, 154, 156 has a diameter D1 to thickness T1 ratio of at least 3. In some embodiments, the thickness T1 (FIG. 8) of each varistor wafer 152, 154, 156 is in the range of from about 0.5 to 15 mm. In some embodiments, the diameter D1 (FIG. 8) of each varistor wafer 152, 154, 156 is in the range of from about 20 to 100 mm.

The varistor wafer 152 has first and second opposed, substantially planar contact surfaces 152U, 152L and a peripheral edge 152E. The varistor wafer 154 has first and second opposed, substantially planar contact surfaces 154U, 154L and a peripheral edge 154E. The varistor wafer 156 has first and second opposed, substantially planar contact surfaces 156U, 156L and a peripheral edge 156E.

The varistor material may be any suitable material conventionally used for varistors, namely, a material exhibiting a nonlinear resistance characteristic with applied voltage. Preferably, the resistance becomes very low when a prescribed voltage is exceeded. The varistor material may be a doped metal oxide or silicon carbide, for example. Suitable metal oxides include zinc oxide compounds.

Each varistor wafer 152, 154, 156 may include a wafer of varistor material coated on either side with a conductive coating 157 so that the exposed surfaces of the coatings serve as the contact surfaces 152U, 152L, 154U, 154L, 156U, 156L. The coatings can be metallization formed of aluminum, copper or silver, for example. Alternatively, the bare surfaces of the varistor material may serve as the contact surfaces 152U, 152L, 154U, 154L, 156U, 156L.

The interconnect members 160, 162 are electrically conductive. The interconnect member 160 includes a pair of axially spaced apart, disk-shaped contact portions 160U, 160L joined by a bridge portion 160B. The interconnect member 162 includes a pair of axially spaced apart, disk-shaped contact portions 162U, 162L joined by a bridge portion 162B.

According to some embodiments, each contact portion 160U, 160L, 162U, 162L is substantially planar, relatively thin and wafer- or disk-shaped. In some embodiments, each contact portion 160U, 160L, 162U, 162L has a diameter D2 (FIG. 8) to thickness T2 (FIG. 8) ratio of at least 15. In some embodiments, the thickness T2 of each contact portion 160U, 160L, 162U, 162L is in the range of from about 0.1 to 3 mm. In some embodiments, the diameter D2 of each contact portion 160U, 160L, 162U, 162L is in the range of from about 20 to 100 mm.

According to some embodiments, each contact portion 160U, 160L, 162U, 162L does not have any through holes extending through the thickness of the contact portion.

In some embodiments, the width W3 (FIG. 6) of each bridge portion 160B, 162B is in the range of from about 2 mm to 10 mm. The cross-sectional area of each bridge portion 160B, 162B should be large enough to withstand the short circuit current that may flow through the SPD after a possible failure of one or more of the varistor wafers 152, 154, 156.

According to some embodiments, the interconnect members 160, 162 are formed of copper. However, any suitable electrically conductive metal may be used. According to some embodiments, the interconnect members 160, 162 are unitary and, in some embodiments, monolithic.

Figure 6:
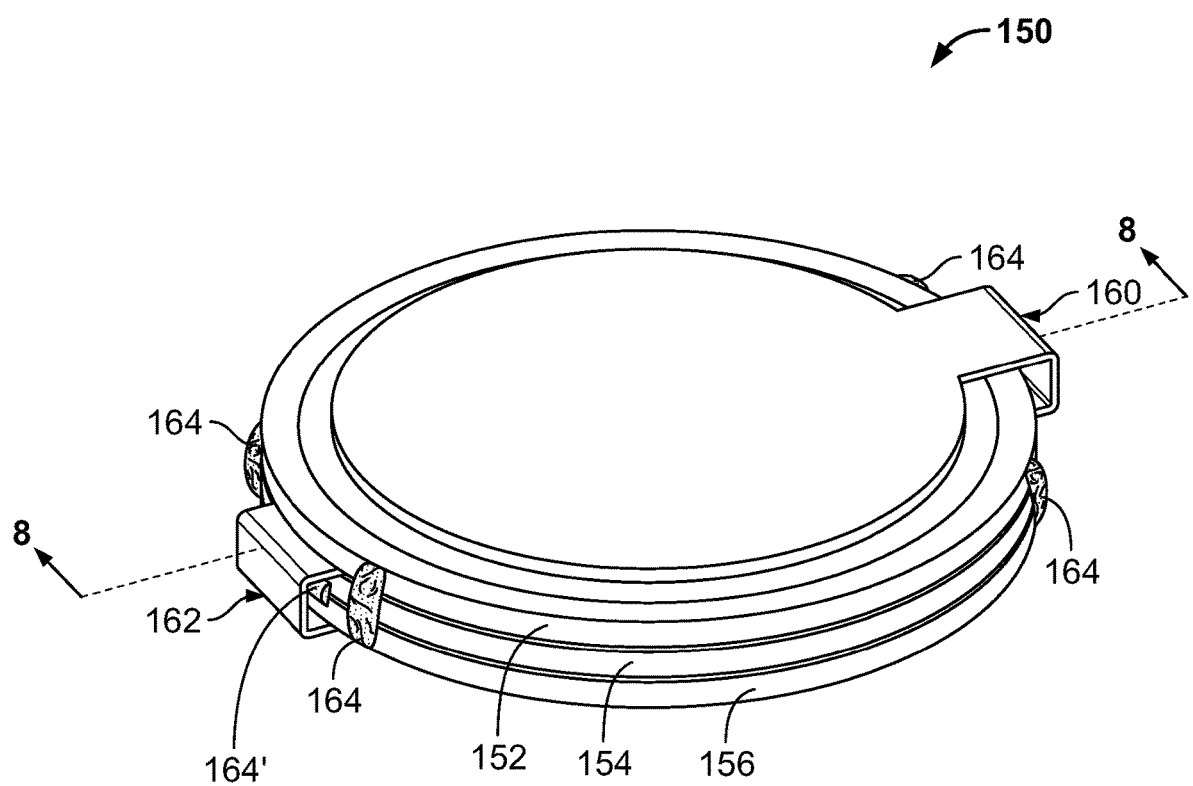
FIG. 6 is a perspective view of a varistor assembly forming a part of the overvoltage protection device of FIG. 3.
Figure 8:
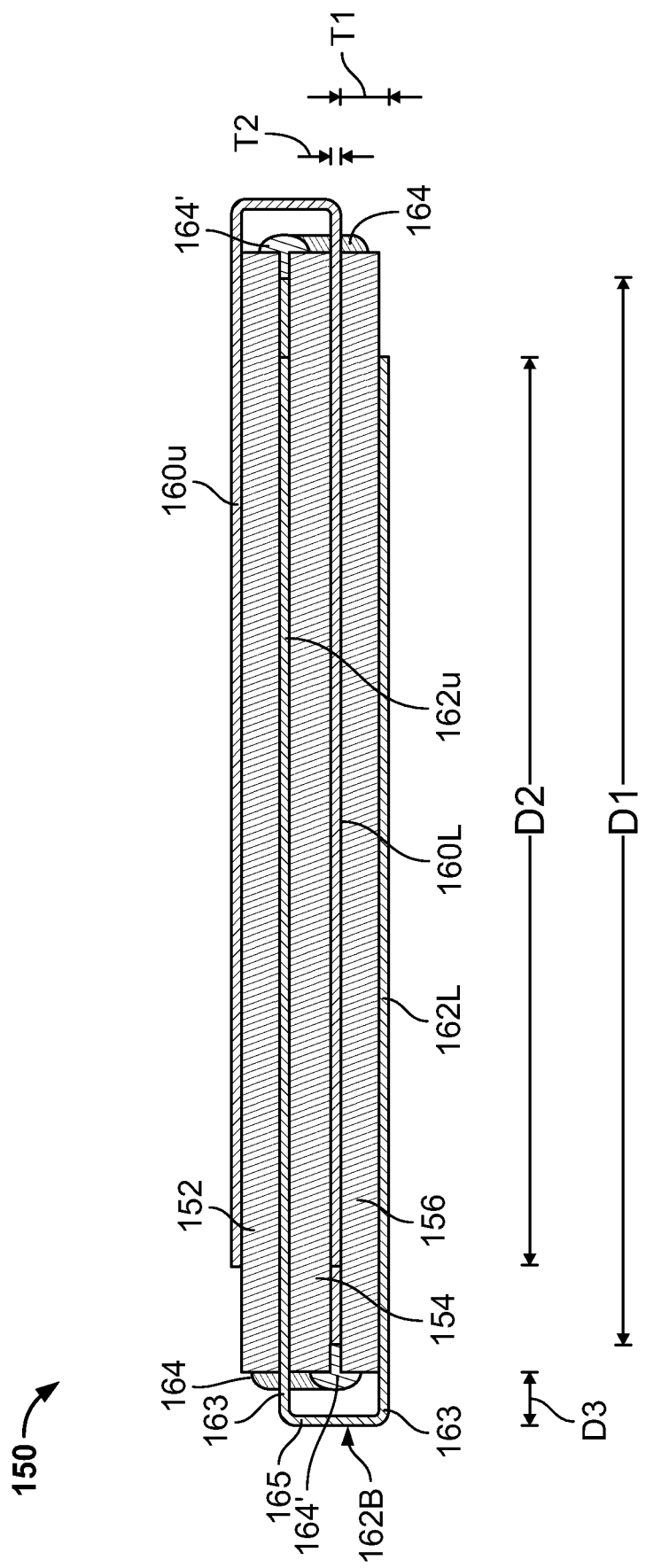
FIG. 8 is a cross-sectional view of the varistor assembly of FIG. 6 taken along the line 8-8 of FIG. 6.
Figure 9:
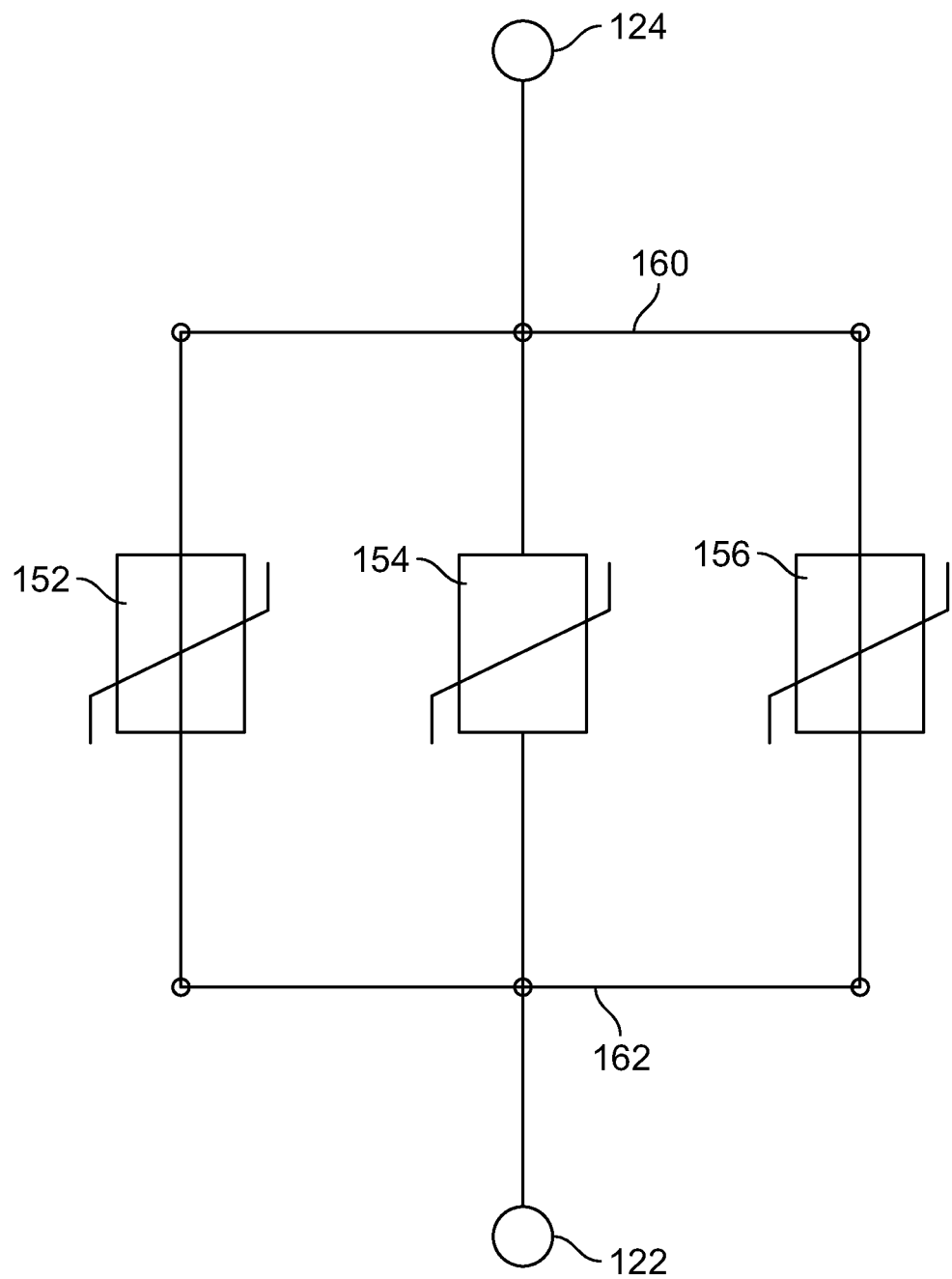
FIG. 9 is a schematic diagram representing an electrical circuit of the varistor assembly of FIG. 6.

In the varistor assembly 150, the varistor wafer 154 is interposed or sandwiched between the varistor wafers 152, 156, the varistor wafers 152, 154, 156 are interposed or sandwiched between the interconnect members 160, 162, and the interconnect members 160, 162 are interleaved with one another as shown in FIGS. 6 and 8. The contact portion 160U engages the contact surface 152U. The contact portion 160L engages the contact surfaces 154L and 156U. The contact portion 162U engages the contact surfaces 152L and 154U. The contact portion 162L engages the contact surface 156L. Each said engagement forms an intimate physical or mechanical contact between the identified interconnect member contact portions and varistor contact surfaces. Each said engagement forms a direct electrical connection or coupling between the identified interconnect member contact portions and varistor contact surfaces. The contact portions 160U and 162L form or serve as the outer electrode contact surfaces of the varistor assembly 150.

Each bridge portion 160B, 162B includes a pair of tab sections 163 (extending radially outwardly from the contact portions 160U, 160L or 162, 162L) and an axially extending connecting section 165 connecting the tab sections 163 and radially spaced apart from the adjacent peripheral edges of the varistor wafers 152, 154, 156. In some embodiments, each connecting section 165 is located a distance D3 (FIG. 8) from the adjacent peripheral edges of the varistor wafers 152, 154, 156. In some embodiments, the distance D3 is in the range of from about 0.5 to 15 mm.

According to some embodiments and as shown, there are no electrical insulators interposed between the components 152, 154, 156, 160, 162.

In some embodiments, the varistor wafers 152, 154, 156 are secured to one another by the bonding agent 164. According to some embodiments, the bonding agent 164 is located at and secures the adjacent varistor wafers 152, 154, 156 at their peripheral edges. In some embodiments, the bonding agent 164 is provided as a plurality of discrete, spaced apart patches or spots of the bonding agent 164. The bonding is used to keep the components of the varistor assembly 150 in place during transportation and assembly of the overvoltage protection device 100.

Figure 7:
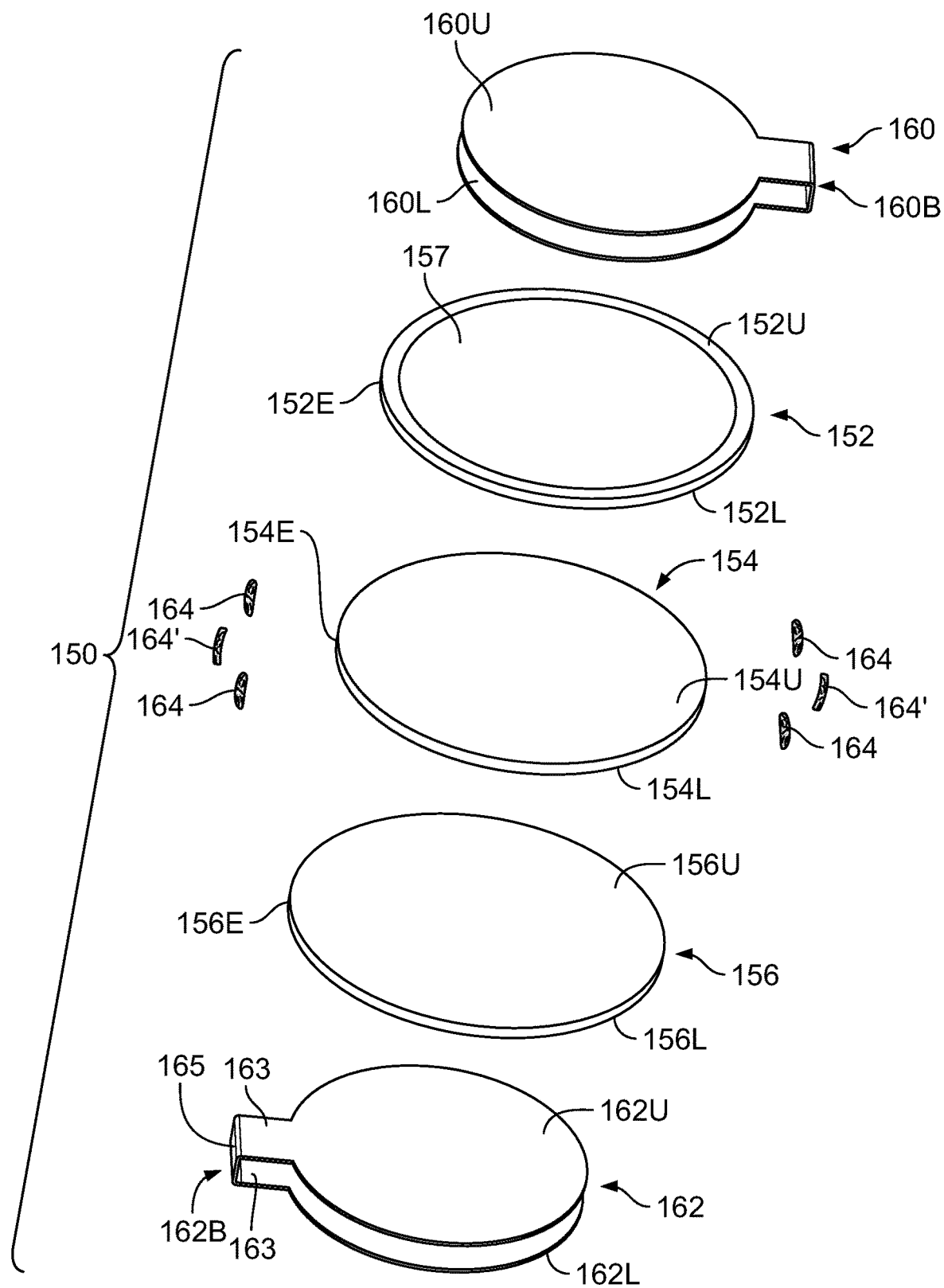
FIG. 7 is an exploded, perspective view of the varistor assembly of FIG. 6.

In some embodiments and as shown in FIGS. 5, 6 and 7, the bonding agent 164 includes a bonding agent portion or portions 164' located within the bridge portions 160, 162B between each bridge portion 160B, 162B and the adjacent edges of the varistor wafers 152, 154, 156. In this way, these bonding agent portions 164' can serve as electrical insulators that electrically insulate the bridge portions 160B, 162B from the edges of the varistor wafers 152, 154, 156.

According to some embodiments, the bonding agent 164 is an adhesive. As used herein, adhesive refers to adhesives and glues derived from natural and/or synthetic sources. The adhesive is a polymer that bonds to the surfaces to be bonded (e.g., the edge surfaces of the varistor wafers 152, 154, 156). The adhesive may be any suitable adhesive. In some embodiments, adhesive 164 is secures the varistor wafers 152, 154, 156 at their peripheral edges and are discrete, spaced apart patches or spots located about the peripheral edges.

In some embodiments, the adhesive 164 is a cyanoacrylate-based adhesive or an epoxy-based adhesive. Suitable cyanoacrylate adhesives may include Permabond 737 adhesive available from Permabond Engineering Adhesives, Inc. of the United States of America.

In some embodiments, the adhesive has a high operating temperature, above 40° C., does not contain any solvent, and has a high dielectric strength (e.g., above 5 kV/mm).

In some embodiments, the outer periphery of each coating 157 is radially inset from the outer periphery of the varistor wafer 152, 154, 156, and the outer periphery of each contact portion 160U, 160L, 162U, 162L is radially inset from the outer periphery of the coating 157.

In other embodiments, the varistor wafers 152, 154, 156 are mechanically secured and electrically directly connected to the respective contact portions 160U, 160L, 162U, 162L by an electrically conductive solder.

The varistor assembly 150 can be assembled as follows in accordance with embodiments of the invention.

The interconnect members 160, 162 may be pre-bent into the shapes shown in FIG. 7.

In some embodiments, each contact portion 160U, 160L, 162U, 162L covers and engages at least 40% of the surface area of the corresponding mating varistor wafer surface 152U, 152L, 154U, 154L, 156U, 156L.

The varistor wafers 152, 154, 156 and the interconnect members 160, 162 are stacked and interleaved in the order and relation as shown in FIGS. 6 and 8. This assembly may be assembled in or placed, after assembly, in a fixture to laterally align the varistor wafers 152, 154, 156 and the interconnect members 160, 162 with respect to one another. In some embodiments, the varistor wafers 152, 154, 156 and the interconnect members 160, 162 are substantially coaxially aligned.

The aligned components 152, 154, 156, 160, 162 are axially compressively loaded, pressed or clamped together (e.g., using the fixture or an additional external clamping or loading device) and into intimate contact. The bonding agent 164 is then applied to the peripheral edges 152E, 154E, 156E of the varistor wafers 152, 154, 156 at locations as discussed above, and cured. The varistor assembly 150 is thus formed. Once the bonding agent 164 has cured, the external loading device is removed from the varistor assembly 150.

The insulator sleeve 134 is tubular and generally cylindrical. According to some embodiments, the insulator sleeve 134 is formed of a high temperature polymer and, in some embodiments, a high temperature thermoplastic. In some embodiments, the insulator sleeve 134 is formed of polyetherimide (PEI), such as ULTEM™ thermoplastic available from SABIC of Saudi Arabia. In some embodiments, the insulator member 134 is formed of non-reinforced polyetherimide.

According to some embodiments, the insulator sleeve 134 is formed of a material having a melting point greater than the melting point of the meltable member 132. According to some embodiments, the insulator sleeve 134 is formed of a material having a melting point in the range of from about 120 to 200° C.

According to some embodiments, the insulator sleeve 134 material can withstand a voltage of 25 kV per mm of thickness.

According to some embodiments, the insulator sleeve 134 has a thickness in the range of from about 0.1 to 2 mm.

The spring washers 128E surround the shaft 124B. Each spring washer 128E includes a hole that receives the shaft 124B. The lowermost spring washer 128E abuts the top face of the head 124A. According to some embodiments, the clearance between the spring washer hole and the shaft 124B is in the range of from about 0.015 to 0.035 inch. The spring washers 128E may be formed of a resilient material. According to some embodiments and as illustrated, the spring washers 128E are wave washers (as shown) or Belleville washers formed of spring steel. While two spring washers 128E are shown, more or fewer may be used. The springs may be provided in a different stack arrangement such as in series, parallel, or series and parallel.

The flat metal washer 128D is interposed between the uppermost spring washer 128E and the insulator ring 128C with the shaft 124B extending through a hole formed in the washer 128D. The washer 128D serves to distribute the mechanical load of the upper spring washer 128E to prevent the spring washer 128E from cutting into the insulator ring 128C.

The insulator ring 128C overlies and abuts the washer 128D. The insulator ring 128C has a main body ring and a cylindrical upper flange or collar extending upwardly from the main body ring. A hole receives the shaft 124B. According to some embodiments, the clearance between the hole and the shaft 124B is in range of from about 0.025 to 0.065 inch. An upwardly and outwardly opening peripheral groove is formed in the top corner of the main body ring.

The insulator ring 128C is preferably formed of a dielectric or electrically insulating material having high melting and combustion temperatures. The insulator ring 128C may be formed of polycarbonate, ceramic or a high temperature polymer, for example.

The end cap 128A overlies and abuts the insulator ring 128C. The end cap 128A has a hole that receives the shaft 124B. According to some embodiments, the clearance between the hole and the shaft 124B is in the range of from about 0.1 to 0.2 inch. The end cap 128A may be formed of aluminum, for example.

The clip 128B is resilient and truncated ring shaped. The clip 128B is partly received in the slot 122I1 and partly extends radially inwardly from the inner wall of the housing 122 to limit outward axial displacement of the end cap 128A. The clip 128B may be formed of spring steel.

The O-ring 130B is positioned in the groove 124G so that it is captured between the shaft 124B and the insulator ring 128C. The O-ring 130A is positioned in the groove in the insulator ring 128C such that it is captured between the insulating member 128C and the sidewall 122B. When installed, the O-rings 130A, 130B are compressed so that they are biased against and form a seal between the adjacent interfacing surfaces. In an overvoltage or failure event, byproducts such as hot gases and fragments from the varistor wafers 152, 154, 156 may fill or scatter into the cavity chamber 126. These byproducts may be constrained or prevented by the O-rings 130A, 130B from escaping the overvoltage protection device 100 through the housing opening 122D.

The O-rings 130A, 130B may be formed of the same or different materials.

According to some embodiments, the O-rings 130A, 130B are formed of a resilient material, such as an elastomer. According to some embodiments, the O-rings 130A, 130B are formed of rubber. The O-rings 130A, 130B may be formed of a fluorocarbon rubber such as VITON™ available from DuPont. Other rubbers such as butyl rubber may also be used. According to some embodiments, the rubber has a durometer of between about 60 and 100 Shore A.

The electrode head 124A and the housing end wall 122A are persistently biased or loaded against the varistor assembly 150 along a load or clamping axis C-C (FIG. 5) in directions F to ensure firm and uniform engagement between the above-identified interfacing contact surfaces. This aspect of the unit 100 may be appreciated by considering a method according to the present invention for assembling the unit 100, as described below. In some embodiments, the clamping axis C-C is substantially coincident with the axis A-A (FIG. 5).

The components 152, 154, 156, 160, 162, 164 are assembled as described above to form the varistor assembly 150. The varistor assembly 150 is placed in the cavity 122C such that the lower contact surface or portion 162L of the interconnect member 162 engages the contact surface 122G of the end wall 122A.

The O-rings 130A, 130B are installed in their respective grooves.

The head 124A is inserted into the cavity 122C such that the contact surface 124C engages the upper contact surface or portion 160U of the interconnect member 160.

The spring washers 128E are slid down the shaft 124B. The washer 128D, the insulator ring 128C, and the end cap 128A are slid down the shaft 124B and over the spring washers 128E. A jig (not shown) or other suitable device is used to force the end cap 128A down, in turn deflecting the spring washers 128E. While the end cap 128A is still under the load of the jig, the clip 128B is compressed and inserted into the slot 122I1. The clip 128B is then released and allowed to return to its original diameter, whereupon it partly fills the slot and partly extends radially inward into the cavity from the slot 122I1. The clip 128B and the slot 122I1 thereby serve to maintain the load on the end cap 128A to partially deflect the spring washers 128E. The loading of the end cap 128A onto the insulator ring 128C and from the insulator ring onto the spring washers is in turn transferred to the head 124A. In this way, the varistor assembly 150 is sandwiched (clamped) between the head 124A and the electrode wall 122A.

When the overvoltage protection device 100 is assembled, the housing 122, the electrode 124, the insulating member 128C, the end cap 128A, the clip 128B, and the O-rings 130A, 130B collectively form a unit housing or housing assembly 121 containing the components in the chamber 126.

In the assembled overvoltage protection device 100, the large, planar contact surfaces of the components 122A, 124A, 152, 154, 156, 160, 162 can ensure reliable and consistent electrical contact and connection between the components during an overvoltage or surge current event. The head 124A and the end wall 122A are mechanically loaded against these components to ensure firm and uniform engagement between the mating contact surfaces.

Advantageously, the overvoltage protection device 100 integrates three varistor wafers 152, 154, 156 in electrical parallel in the same modular device, so that energy can be shared between the varistor wafers 152, 154, 156 during electrical conduction.

The design of the overvoltage protection device 100 provides compressive loading of the varistor wafers 152, 154, 156 in a single modular unit. The overvoltage protection device 100 provides suitable electrical interconnections between the electrodes 122, 124 and the varistor wafers 152, 154, 156, while retaining a compact form factor and providing proper thermal dissipation of energy from the varistor wafers 152, 154, 156.

The construction of the overvoltage protection device 100 provides a safe failure mode for the device. During use, one or more of the varistor wafers 152, 154, 156 may be damaged by overheating and may generate arcing inside the housing assembly 121. The housing assembly 121 can contain the damage (e.g., debris, gases and immediate heat) within the overvoltage protection device 100, so that the overvoltage protection device 100 fails safely. In this way, the overvoltage protection device 100 can prevent or reduce any damage to adjacent equipment (e.g., switch gear equipment in the cabinet) and harm to personnel. In this manner, the overvoltage protection device 100 can enhance the safety of equipment and personnel.

Additionally, the overvoltage protection device 100 provides a fail-safe mechanism in response to end of life mode in one of more of the varistor wafers 152, 154, 156. In case of a failure of a varistor wafer 152, 154, 156, a fault current will be conducted between the corresponding line and the neutral line. As is well known, a varistor has an innate nominal clamping voltage VNOM (sometimes referred to as the "breakdown voltage" or simply the "varistor voltage") at which the varistor begins to conduct current. Below the VNOM, the varistor will not pass current. Above the VNOM, the varistor will conduct a current (i.e., a leakage current or a surge current). The VNOM of a varistor is typically specified as the measured voltage across the varistor with a DC current of 1 mA.

As is known, a varistor has three modes of operation. In a first normal mode (discussed above), up to a nominal voltage, the varistor is practically an electrical insulator. In a second normal mode (also discussed above), when the varistor is subjected to an overvoltage, the varistor temporarily and reversibly becomes an electrical conductor during the overvoltage condition and returns to the first mode thereafter. In a third mode (the so-called end of life mode), the varistor is effectively depleted and becomes a permanent, non-reversible electrical conductor.

The varistor also has an innate clamping voltage VC (sometimes referred to as simply the "clamping voltage"). The clamping voltage VC is defined as the maximum voltage measured across the varistor when a specified current is applied to the varistor over time according to a standard protocol.

In the absence of an overvoltage condition, the varistor wafer 152, 154, 156 provides high resistance such that no current flows through the overvoltage protection device 100 as it appears electrically as an open circuit. That is, ordinarily the varistor passes no current. In the event of an overcurrent surge event (typically transient; e.g., lightning strike) or an overvoltage condition or event (typically longer in duration than an overcurrent surge event) exceeding VNOM, the resistance of the varistor wafer decreases rapidly, allowing current to flow through the overvoltage protection device 100 and create a shunt path for current flow to protect other components of an associated electrical system. Normally, the varistor recovers from these events without significant overheating of the overvoltage protection device 100.

Varistors have multiple failure modes. The failure modes include: 1) the varistor fails as a short circuit; and 2) the varistor fails as a linear resistance. The failure of the varistor to a short circuit or to a linear resistance may be caused by the conduction of a single or multiple surge currents of sufficient magnitude and duration or by a single or multiple continuous overvoltage events that will drive a sufficient current through the varistor.

A short circuit failure typically manifests as a localized pinhole or puncture site (herein, "the failure site") extending through the thickness of the varistor. This failure site creates a path for current flow between the two electrodes of a low resistance, but high enough to generate ohmic losses and cause overheating of the device even at low fault currents. Sufficiently large fault current through the varistor can melt the varistor in the region of the failure site and generate an electric arc.

A varistor failure as a linear resistance will cause the conduction of a limited current through the varistor that will result in a buildup of heat. This heat buildup may result in catastrophic thermal runaway and the device temperature may exceed a prescribed maximum temperature. For example, the maximum allowable temperature for the exterior surfaces of the device may be set by code or standard to prevent combustion of adjacent components. If the leakage current is not interrupted at a certain period of time, the overheating will result eventually in the failure of the varistor to a short circuit as defined above.

In some cases, the current through the failed varistor could also be limited by the power system itself (e.g., ground resistance in the system or in photo-voltaic (PV) power source applications where the fault current depends on the power generation capability of the system at the time of the failure) resulting in a progressive build up of temperature, even if the varistor failure is a short circuit. There are cases where there is a limited leakage current flow through the varistor due to extended in time overvoltage conditions due to power system failures, for example. These conditions may lead to temperature build up in the device, such as when the varistor has failed as a linear resistance and could possibly lead to the failure of the varistor either as a linear resistance or as a short circuit as described above.

As discussed above, in some cases the overvoltage protection device 100 may assume an "end of life" mode in which a varistor wafer 152, 154, 156 is depleted in full or in part (i.e., in an "end of life" state), leading to an end of life failure. When the varistor reaches its end of life, the overvoltage protection device 100 will become substantially a short circuit with a very low but non-zero ohmic resistance. As a result, in an end of life condition, a fault current will continuously flow through the varistor even in the absence of an overvoltage condition. In this case, the meltable member 132 can operate as a fail-safe mechanism that by-passes the failed varistor and creates a permanent low-ohmic short circuit between the terminals of the overvoltage protection device 100 in the manner described in U.S. Pat. No. 7,433,169, the disclosure of which is incorporated herein by reference.

The meltable member 132 is adapted and configured to operate as a thermal disconnect to electrically short circuit the current applied to the associated overvoltage protection device 100 around the varistor wafers 152, 154, 156 to prevent or reduce the generation of heat in the varistors. In this way, the meltable member 132 can operate as switch to bypass the varistor wafers 152, 154, 156 and prevent overheating and catastrophic failure as described above. As used herein, a fail-safe system is "triggered" upon occurrence of the conditions necessary to cause the fail-safe system to operate as described to short circuit the electrodes 122A, 124A.

When heated to a threshold temperature, the meltable member 132 will flow to bridge and electrically connect the electrodes 122A, 124A. The meltable member 132 thereby redirects the current applied to the overvoltage protection device 100 to bypass the varistors 152, 154, 156 so that the current induced heating of the varistor ceases. The meltable member 132 may thereby serve to prevent or inhibit thermal runaway (caused by or generated in a varistor 152, 154, 156) without requiring that the current through the overvoltage protection device 100 be interrupted.

More particularly, the meltable member 132 initially has a first configuration as shown in FIG. 5 such that it does not electrically couple the electrode 124 and the housing 122 except through the head 124A. Upon the occurrence of a heat buildup event, the electrode 124 is thereby heated. The meltable member 132 is also heated directly and/or by the electrode 124. During normal operation, the temperature in the meltable member 132 remains below its melting point so that the meltable member 132 remains in solid form. However, when the temperature of the meltable member 132 exceeds its melting point, the meltable member 132 melts (in full or in part) and flows by force of gravity into a second configuration different from the first configuration. The meltable member 132 bridges or short circuits the electrode 124 to the housing 122 to bypass the varistor wafers 152, 154, 156. That is, a new direct flow path or paths are provided from the surface of the electrode 124 to the surface of the housing sidewall 122B through the meltable member 132. According to some embodiments, at least some of these flow paths do not include the varistor wafers 152, 154, 156.

According to some embodiments, the overvoltage protection device 100 is adapted such that when the meltable member 132 is triggered to short circuit the overvoltage protection device 100, the conductivity of the overvoltage protection device 100 is at least as great as the conductivity of the feed and exit cables connected to the device.

Electrical protection devices according to embodiments of the present invention may provide a number of advantages in addition to those mentioned above. The devices may be formed so to have a relatively compact form factor. The devices may be retrofittable for installation in place of similar type surge protective devices not having circuits as described herein. In particular, the present devices may have the same length dimension as such previous devices.

There are applications when there is a requirement for an SPD having a lower residual voltage at the same nominal operating voltage. For example, this is a requirement for some telecom applications rated for −48 Vdc systems. If an SPD is used that includes a varistor (e.g., an MOV), a typical continuous operation voltage Vc for such a varistor is 100 Vdc. However, this SPD will have a residual voltage Vres of around 300V or more. It would be beneficial for the better protection of the equipment to use SPDs with a residual voltage Vres much lower than these levels (i.e., close to 100V).

Typically, in order to reduce the residual voltage of an SPD, manufacturers have used a technology other than varistors, such as SADs or TVS diodes. These components have a much lower residual voltage than MOVs for the same continuous operating voltage Vc. For example, a TVS diode for this application may have a residual voltage of 100 V. But SADs and TVS diodes typically cannot conduct the surge currents of significant energies that are expected in such applications. For that reason, many manufacturers have used multiple SADs and/or TVS diodes in parallel to achieve higher energy withstand capabilities during surge current conduction.

In the overvoltage protection device 100, the varistor wafers 152, 154, 156 are connected in electrical parallel to reduce the residual voltage Vres of the overvoltage protection device 100.

In some embodiments, each varistor wafer 152, 154, 156 is rated for 60 Vdc (continuous operating voltage; Vc) instead of 100 Vdc that is typical for this application. Further, the use of three varistors in parallel reduces even further the clamping voltage of the SPD at a given surge current (as compared to using a single varistor), as each varistor will conduct only a fraction of the overall surge current (the clamping voltage depends on the conducted surge current, the higher the conducted surge current the higher the clamping voltage of the varistor). For the telecom applications (nominal voltage of −48 Vdc), the resultant residual voltage is around 140 V at a surge current of 5 kA.

In some embodiments, the overvoltage protection device 100 is used in a DC power system and, in some embodiments, in a protection circuit of −48 Vdc telecommunications equipment. The device 100 may also be used in AC or other DC applications.

The reduction of the rated voltage of the varistor wafers 152, 154, 156 makes the varistor wafers 152, 154, 156 thinner and sensitive to significant temperature variations. Therefore, how the stack of varistor wafers is held in place and assembled inside the overvoltage protection device 100 is important.

As mentioned above, in some embodiments the varistor wafers varistor wafers 152, 154, 156 may be secured to the interconnect members 160, 162 and/or each other using solder. However, the use of solder may damage the varistor wafer. The high temperature required to melt the soldering material and the different coefficients of elasticity between the varistor material and the solder may create micro cracks in the varistor. Loading on the varistor wafer by electrodes may also cause cracks in the varistor wafer. These cracks as well as flux or impurities that intrude into the cracks can progressively damage and thereby derate the varistor. Intruding flux may create a conductive path on the edge of a crack that increases leakage current, which can lead to failure of the varistor wafer. These risks are particularly of concern in the case of relatively thin (e.g., less than about 2 mm) ceramic varistor wafers.

Further, to avoid mechanical damage on the varistor due to different thermal expansion between the varistor and the interconnect members 160, 162, the shape of the interconnect member contact portions should be round with a hole in the middle. The hole may decrease the uniform distribution of the current over the surface of the varistor. The hole may also reduce the energy withstand capability of the varistor during surge currents, as it will significantly decrease the heat shrink capabilities of the varistor and increase the contact resistance and overall strength of the stack forming the varistor assembly 150.

As discussed above, in some embodiments, the varistor wafers 152, 154, 156 are stacked in parallel and bonded or adhered together by adhesive 164 on their edges 152E, 154E, 156E. The adhesive 164 on the edges 152E, 154E, 156E provides a compact assembly for transport and manipulation in production of the varistor assembly 150 and the device 100.

Moreover, the adhesive 164 rectifies the above mentioned issues. The adhesive holds the varistor wafers 152, 154, 156 and the interconnect members 160, 162 together for handling without introducing heating, solder and flux that may cause micro cracks and introduce conductive paths as discussed above.

The adhesive permits the use of the contact portions 160U, 160L, 162U, 162L of the interconnect members that do not include holes within their peripheries (i.e., are full face electrodes). As a result, the energy withstand capability of the varistor assembly 150 during surge events is increased. The contact resistances between the varistor wafers 152, 154, 156 and the interconnect members 160, 162 are reduced. The expected residual voltage during surges is thereby reduced.

According to some embodiments, the areas of engagement between each of the electrode contact surfaces and the varistor contact surfaces are each at least one square inch.

According to some embodiments, the biased electrodes (e.g., the electrodes 122 and 124) apply a load to the varistors along the axis C-C in the range of from 2000 lbf and 26000 lbf depending on its surface area.

According to some embodiments, the combined thermal mass of the housing (e.g., the housing 122) and the electrode (e.g., the electrode 124) is substantially greater than the thermal mass of each of the varistors captured therebetween. The greater the ratio between the thermal mass of the housing and electrodes and the thermal mass of the varistors, the better the varistors will be preserved during exposure to surge currents and TOV events and therefore the longer the lifetime of the SPD. As used herein, the term "thermal mass" means the product of the specific heat of the material or materials of the object multiplied by the mass or masses of the material or materials of the object. That is, the thermal mass is the quantity of energy required to raise one gram of the material or materials of the object by one degree centigrade times the mass or masses of the material or materials in the object. According to some embodiments, the thermal mass of at least one of the electrode head and the electrode wall is substantially greater than the thermal mass of the varistor. According to some embodiments, the thermal mass of at least one of the electrode head and the electrode wall is at least two times the thermal mass of the varistor, and, according to some embodiments, at least ten times as great. According to some embodiments, the combined thermal masses of the head and the electrode wall are substantially greater than the thermal mass of the varistor, according to some embodiments at least two times the thermal mass of the varistor and, according to some embodiments, at least ten times as great.

As discussed above, the spring washers 128E are Belleville or wave washers. Belleville or wave washers may be used to apply relatively high loading without requiring substantial axial space. However, other types of biasing means may be used in addition to or in place of the Belleville or wave washers. Suitable alternative biasing means include one or more coil springs or spiral washers.

The varistor assembly 150 includes three varistors and two interconnect members. However, varistor assemblies according to further embodiments may include more than three varistors stacked and connected in electrical parallel as described. For example, a varistor assembly can include five varistors stacked and connected in electrical parallel by three interconnect members.

Figure 10:
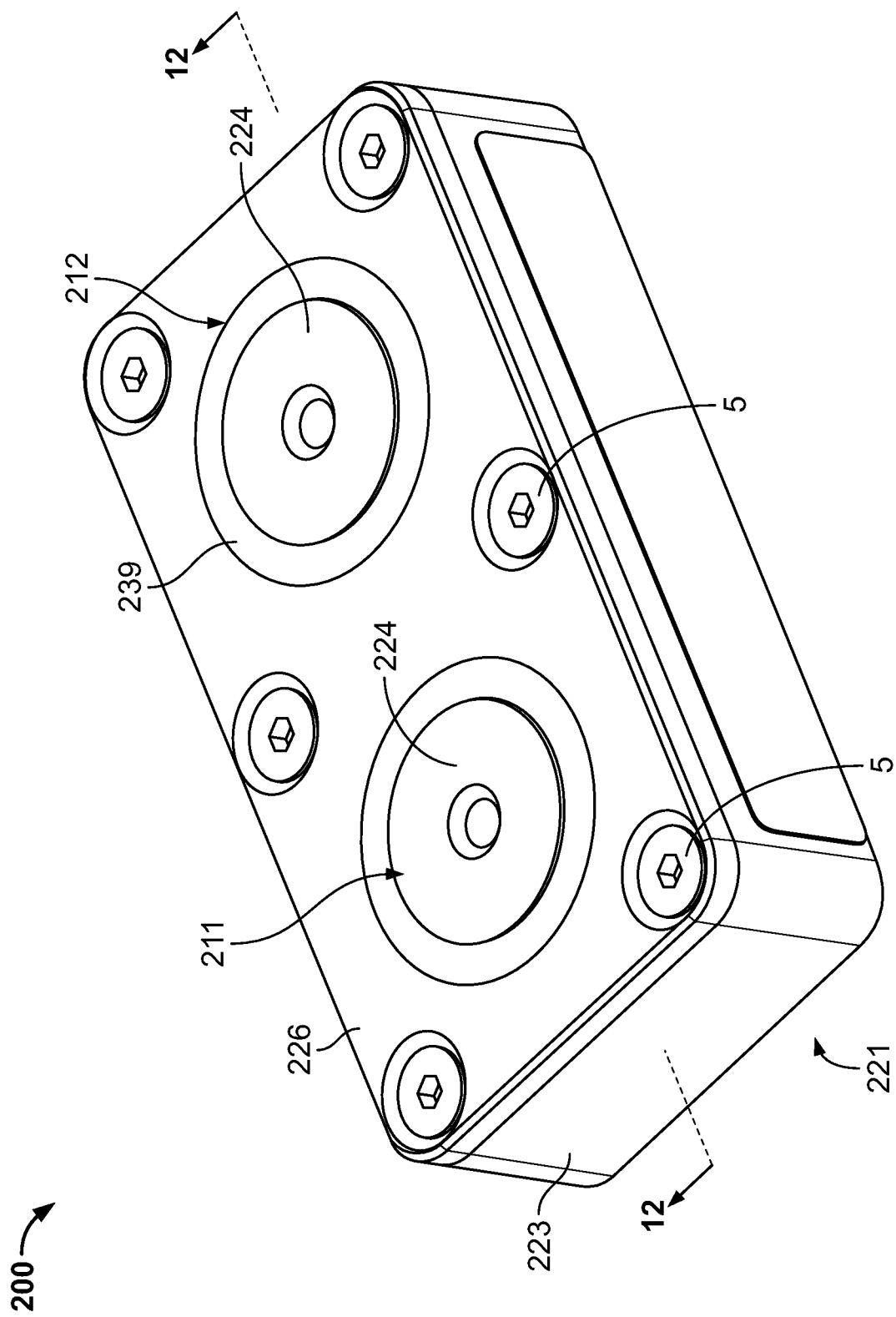
FIG. 10 is a perspective view of an overvoltage protection device according further embodiments of the invention.
Figure 11:
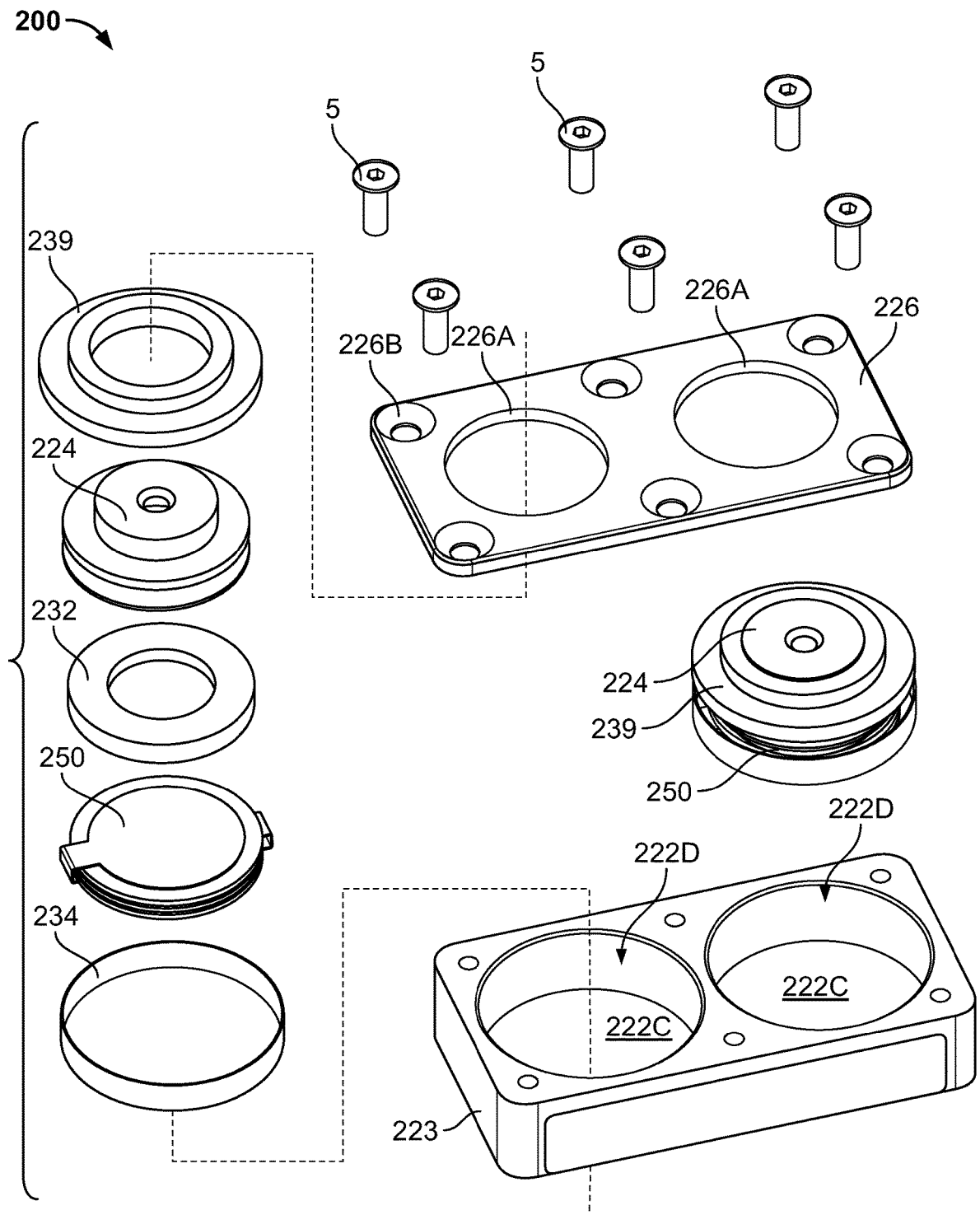
FIG. 11 is an exploded, perspective view of the overvoltage protection device of FIG. 10.
Figure 12:
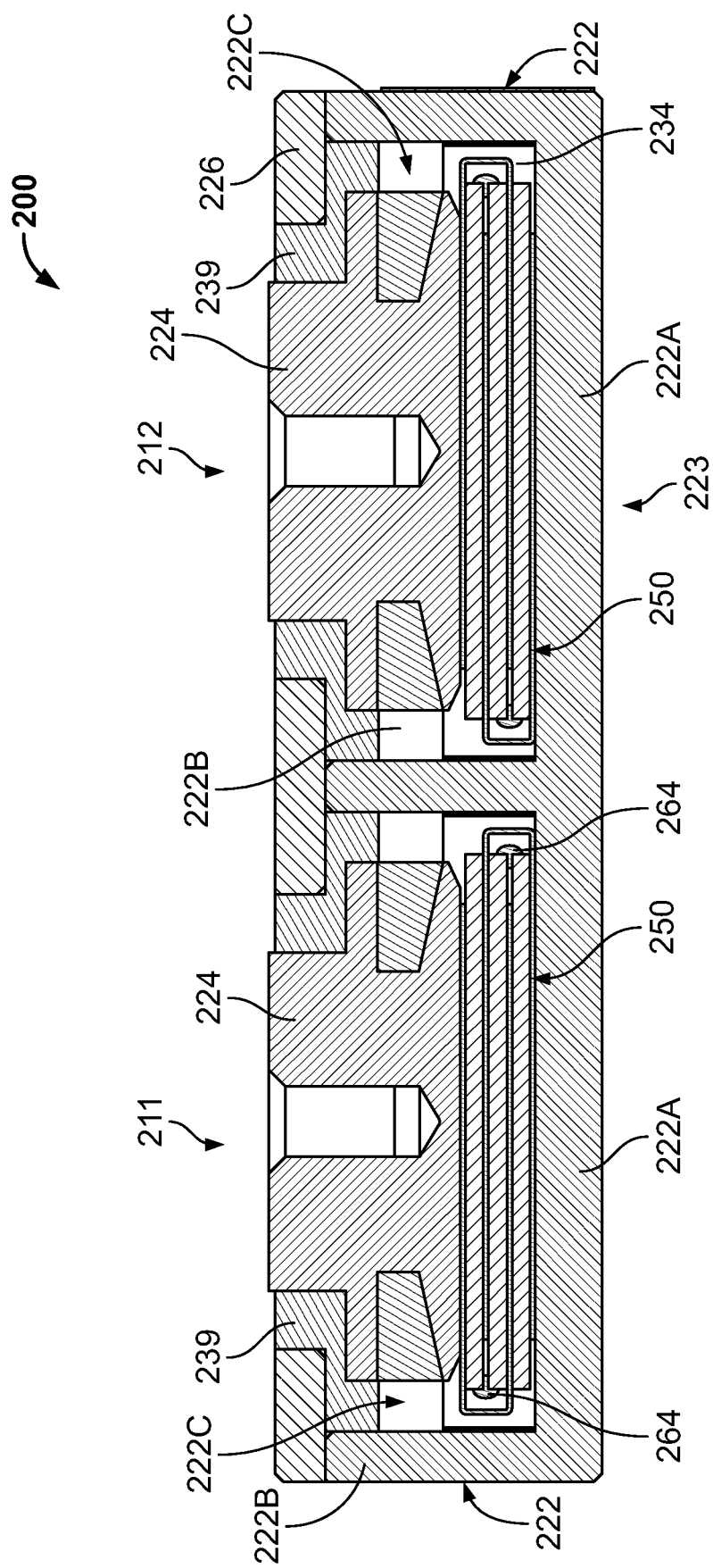
FIG. 12 is a cross-sectional view of the overvoltage protection device of FIG. 10 taken along the line 12-12 of FIG. 10.

With reference to FIGS. 10-12, a modular overvoltage protection unit 200 according to further embodiments of the invention is shown therein. The overvoltage protection unit 200 can be used in the same manner and for the same purpose as the overvoltage protection device 100, except that the unit 200 is generally operationally equivalent to two if the overvoltage protection devices 100.

The overvoltage protection unit 200 includes a housing assembly 221 and two SPD internal component sets or submodules 211, 212.

The housing assembly 221 includes a first electrode or housing 223 and a cover 226. The housing 223 is unitary and, in some embodiments, monolithic. The housing 223 is formed of an electrically conductive metal such as aluminum. The housing 223 includes two integral housing electrode wall portions 222. Each housing electrode portion 222 includes an electrode wall 222A, a sidewall 222B, a cavity 222C, and a top opening 222D corresponding to the features 122A, 122B, 122C and 122D, respectively, of the device 100.

The cover 226 is substantially plate-shaped and has a profile matching that of the housing 223. The cover 226 has two electrode openings 226A and six fastening bores 226B defined therein. According to some embodiments, the cover 226 is formed of an electrically conductive material. In some embodiments, the cover 226 is formed of a metal and, in some embodiments, are formed of aluminum.

The SPD submodules 211, 212 each include an electrode 224, a meltable member 232, an insulator sleeve 234, and a varistor assembly 250 corresponding to the components 124, 132, 134, and 150, respectively, of the device 100. Each SPD submodule 211, 212 further includes an elastomeric insulator member 239.

The insulator members 239 are formed of an electrically insulating, resilient, elastomeric material. According to some embodiments, the insulator members 239 are formed of a material having a hardness in the range of from about 60 Shore A to 85 Shore A. According to some embodiments, the insulator members 239 are formed of rubber. According to some embodiments, the insulator members 239 are formed of silicone rubber. Suitable materials for the insulator members 239 may include KE-5612G or KE-5606 silicone rubber available from Shin-Etsu Chemical Co. Ltd.

Each SPD submodule 211, 212 is disposed in respective one of the housing cavities 222C. The cover 226 is secured to the housing 223 by bolts 5. The cover 226 captures the SPD submodules 211, 212 and axially compresses the elastomeric insulators 239 thereof. The SPD submodule 211 and its electrode wall 222A form a first overvoltage protection device corresponding to the device 100. The SPD submodule 212 and its electrode wall 222A form a second overvoltage protection device corresponding to the device 100.

When the unit 200 is assembled, the insulator member 239 of each SPD submodule 211, 212 is captured between the cover 226 and the electrode upper flange 224D and axially compressed (i.e., axially loaded and elastically deformed from its relaxed state) so that the insulator member 239 serves as a biasing member and applies a persistent axial pressure or load to the electrode 224 and the cover 226. The insulator member 239 also serves to electrically insulate the housing 223 from the electrode 224. The compressed insulator member 239 can also form a seal to constrain or prevent overvoltage event byproducts, such as hot gases and fragments from the varistor wafers of the varistor assembly 250 from escaping the unit 200 through the corresponding housing opening 222D.

The varistor assemblies 250 can provide the same advantages in the unit 200 as discussed above for the varistor assembly 150. Each varistor assembly 250 includes adhesive 264 corresponding to the adhesive 164, 164'.

In other embodiments, the SPD submodules 211, 212 can employ separate springs and insulating rings as described with regard to the device 100.

In further embodiments, each SPD submodule 211, 212 can include a single varistor wafer in place of the multi-varistor varistor assembly 250.

Figure 13:
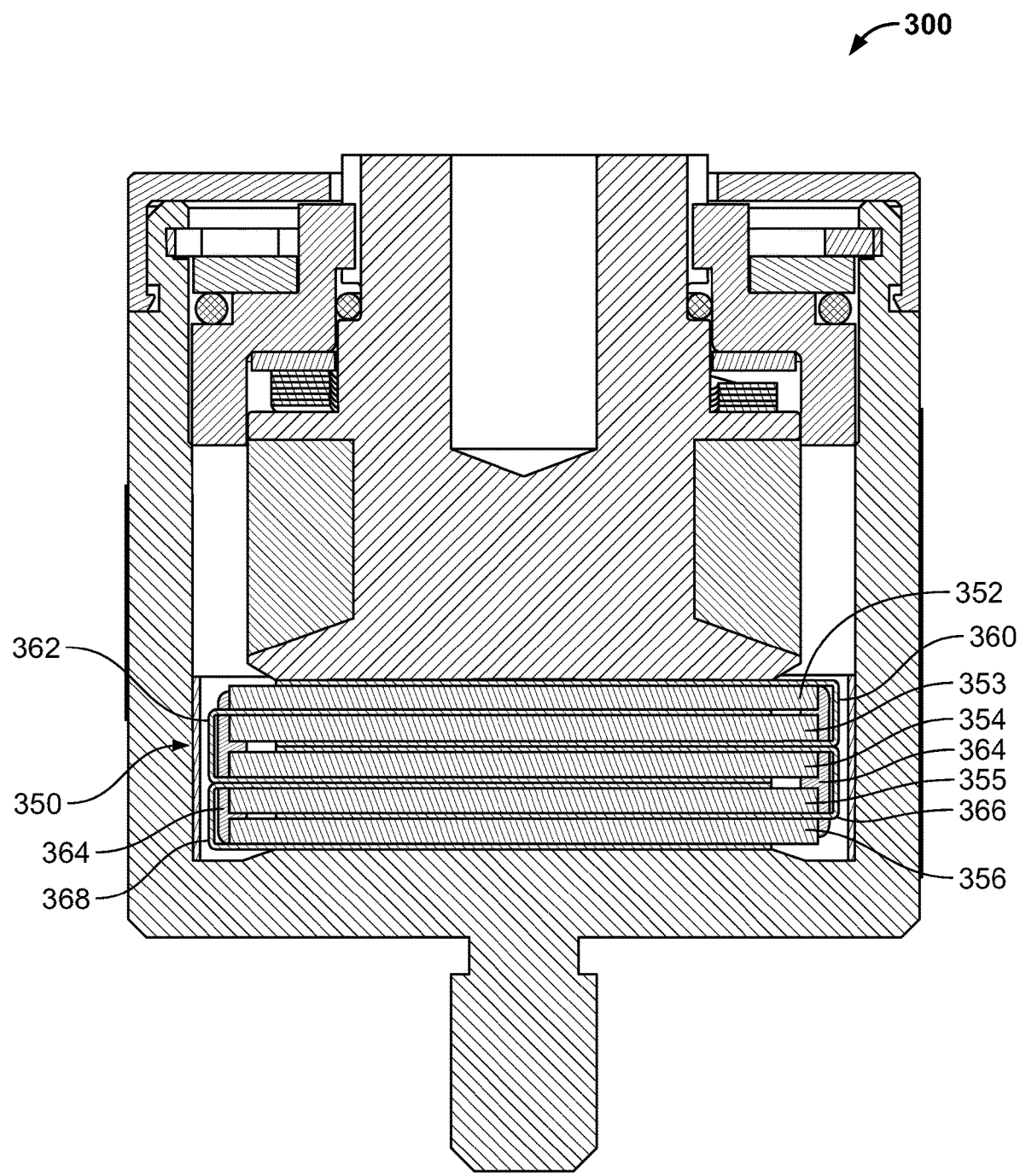
FIG. 13 is a cross-sectional view of an overvoltage protection device according further embodiments of the invention.

With reference to FIG. 13, a modular overvoltage protection device 300 according to further embodiments of the invention is shown therein. The overvoltage protection unit 300 can be used in the same manner and for the same purpose as the overvoltage protection device 100. The overvoltage protection device 300 is constructed in the same manner as the overvoltage protection device 100, except as follows.

The overvoltage protection device 300 includes a varistor assembly 350 corresponding to the varistor assembly 150, except as follows. The varistor assembly 350 includes five varistor wafers 352, 353, 354, 355, 356, four interconnect members 360, 362, 366, 368, and bonding agents 364. The varistor wafers 352, 353, 354, 355, 356 correspond to and are formed in the same manner as the varistor wafers 152, 154, 156. The interconnect members 360, 362, 366, 368 correspond to and are formed in the same manner as the interconnect members 160, 162. The bonding agents 364 correspond to the bonding agents 164, 164'. The five varistor wafers 352, 353, 354, 355, 356 are axially stacked, bonded and connected in electrical parallel by the four interconnect members 360, 362, 366, 368.

Figure 14:
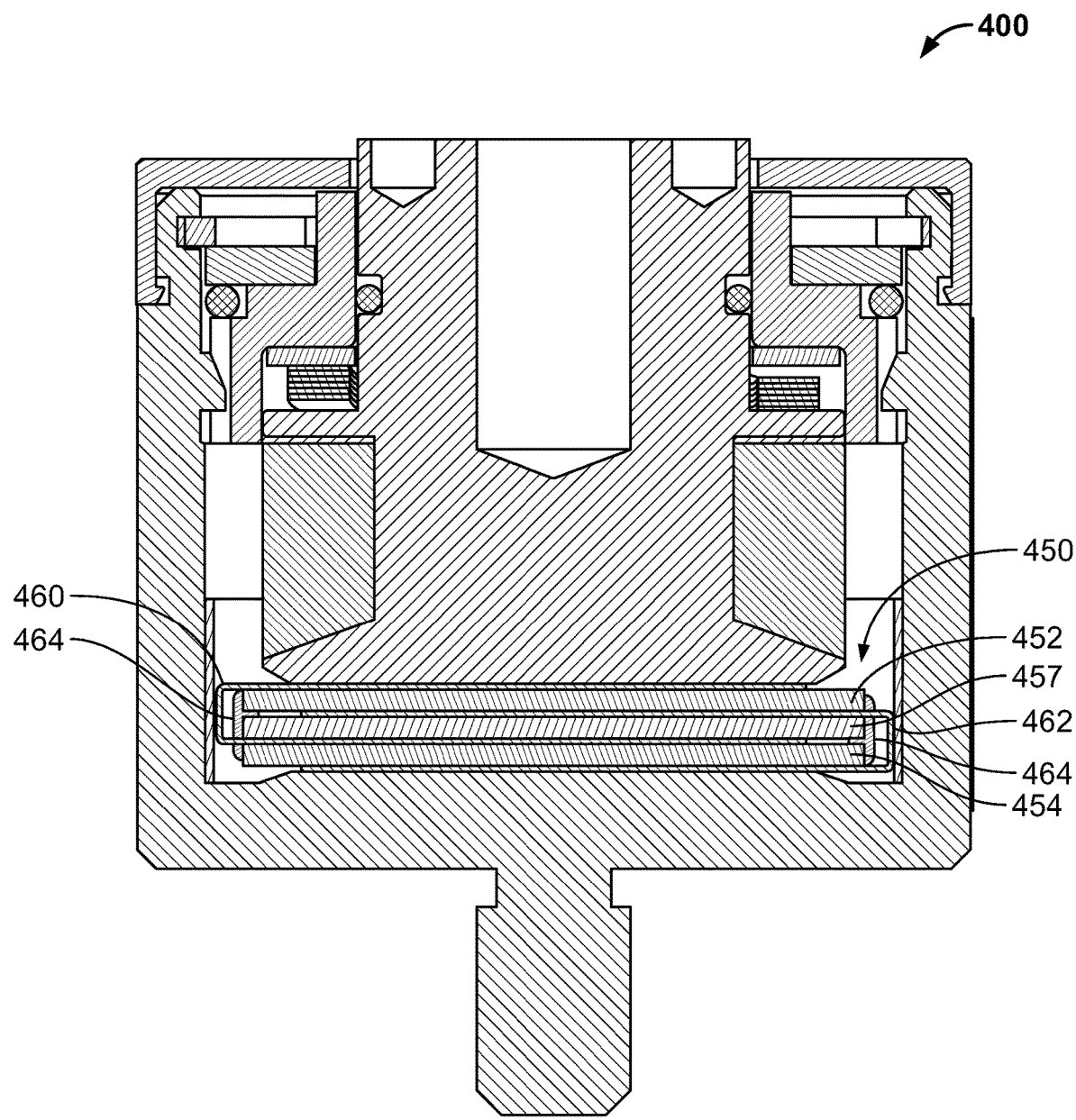
FIG. 14 is a cross-sectional view of an overvoltage protection device according further embodiments of the invention.

With reference to FIG. 14, a modular overvoltage protection unit 400 according to further embodiments of the invention is shown therein. The overvoltage protection device 400 can be used in the same manner and for the same purpose as the overvoltage protection device 100. The overvoltage protection device 400 is constructed in the same manner as the overvoltage protection device 100, except as follows.

The overvoltage protection device 400 includes a varistor assembly 450 corresponding to the varistor assembly 150, except as follows. The varistor assembly 450 includes two varistor wafers 452, 454, two interconnect members 460, 462, bonding agents 464 and an electrical insulator wafer 457. The varistor wafers 452, 454 correspond to and are formed in the same manner as the varistor wafers 152, 154, 156. The interconnect members 460, 462 correspond to and are formed in the same manner as the interconnect members 160, 162. The bonding agents 464 correspond to the bonding agents 164, 164'. The insulator wafer 457 is formed of an electrically insulating material. Suitable electrical insulating materials may include ULTEM™ 1000 thermoplastic available from SABIC, mica, or polyester film such as DYFILM™ polyester film available from Coveme of Italy, for example. The two varistor wafers 452, 454 are axially stacked and connected in electrical parallel by the two interconnect members 460, 462. The insulator wafer 457 is axially interposed or stacked between the varistor wafers 452, 454 to prevent short circuiting between the opposing faces of the varistor wafers 452, 454.

Figure 15:
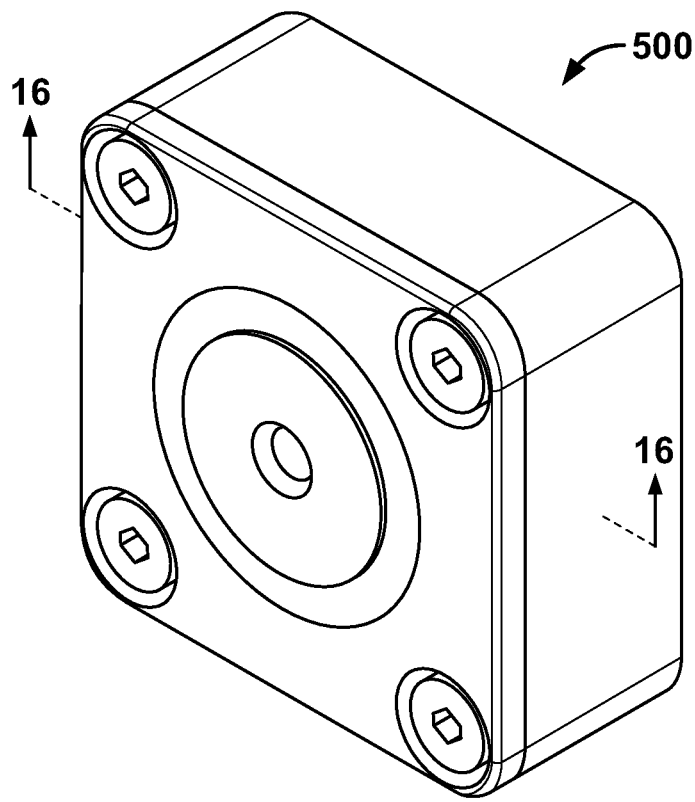
FIG. 15 is a perspective view of an overvoltage protection device according further embodiments of the invention.
Figure 16:
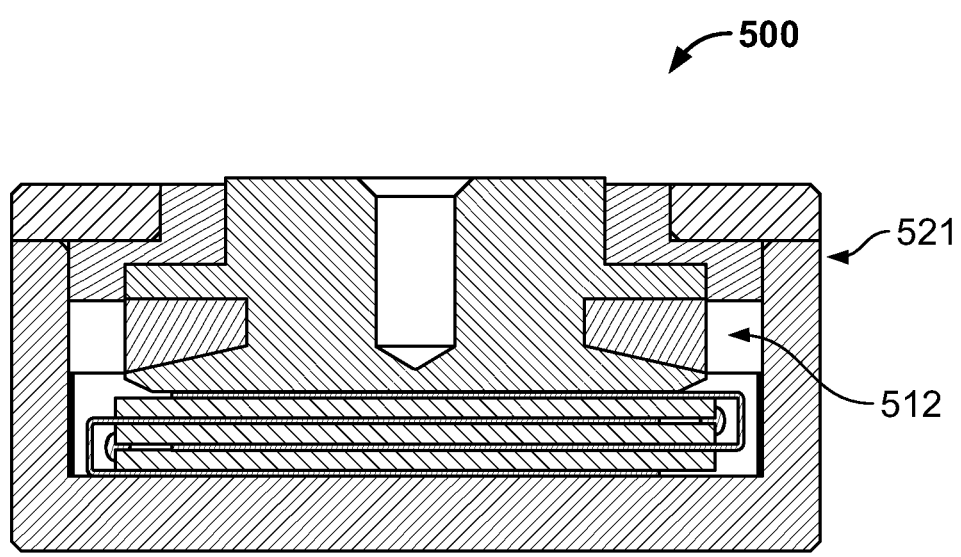
FIG. 16 is a cross-sectional view of the overvoltage protection device of FIG. 15 taken along the line 16-16 of FIG. 15.

With reference to FIGS. 15 and 16, a modular overvoltage protection device 500 according to further embodiments of the invention is shown therein. The overvoltage protection device 500 can be used in the same manner and for the same purpose as the overvoltage protection device 100.

The overvoltage protection device 500 is constructed as one half of the unit 200 (FIG. 12). The device 500 includes a housing assembly 521 that is one half of the housing assembly 221 and an SPD internal component set 512 corresponding to the submodule 212.

With reference to FIGS. 17-20, a modular overvoltage protection device 600 according to further embodiments of the invention is shown therein. The overvoltage protection device 600 can be used in the same manner and for the same purpose as the overvoltage protection device 100. The overvoltage protection device 600 is constructed in the same manner as the overvoltage protection device 100, except as follows.

The overvoltage protection device 600 includes a varistor assembly 650 corresponding to the varistor assembly 150, except as follows. The varistor assembly 650 includes three varistor wafers 652, 654, 656 and two interconnect members 660, 662. The varistor wafers 652, 654, 656 correspond to and are formed in the same manner as the varistor wafers 152, 154, 156. The interconnect members 660, 662 correspond to and are formed in the same manner as the interconnect members 160, 162. The varistor wafers 652, 654, 656 are axially stacked and connected in electrical parallel by the interconnect members 660, 662 as discussed above for the device 100.

The overvoltage protection device 600 further includes an electrically insulating void filling member or sleeve 636. The sleeve 636 includes a side wall 636A defining a through passage 636B. The passage 636 extends from an upper opening 636C to a lower opening 636D. A pair of laterally opposing, axially extending receiver channels 636E are defined in the inner surface 636F of the side wall 636A.

The sleeve 636 is tubular and has an outer surface 636G that is generally cylindrical. According to some embodiments, the sleeve 636 is formed of a high temperature polymer and, in some embodiments, a high temperature thermoplastic. In some embodiments, the sleeve 636 is formed of polyetherimide (PEI), such as ULTEM' thermoplastic available from SABIC of Saudi Arabia. In some embodiments, the sleeve 636 is formed of non-reinforced polyetherimide. In some embodiments, the sleeve 636 is formed of an electrically insulating ceramic.

According to some embodiments, the sleeve 636 is formed of a material having a melting point greater than the melting point of the meltable member 632. According to some embodiments, the sleeve 636 is formed of a material having a melting point in the range of from about 120 to 200° C.

According to some embodiments, the sleeve 636 material can withstand a voltage of 25 kV per mm of thickness.

According to some embodiments, the sleeve side wall 636A has a nominal thickness T5 (FIG. 20) of at least 2 mm, in some embodiments at least 4 mm, and in some embodiments in the range of from about 2 to 15 mm. According to some embodiments, the depth D5 of each receiver channel 636E is at least 1 mm and, in some embodiments, in the range of from about 1 to 12 mm.

The internal chamber 627 of the housing assembly 621 of the overvoltage protection device 600 includes a first subchamber 627A and a second subchamber 627B in fluid communication with the first subchamber 627A. Prior to melting of the meltable member 632, the electrode 624 and the meltable member 632 occupy the first subchamber 627A. The varistor assembly 650 occupies a central volume of the second subchamber 627B such that a remaining tubular void or gap volume 627C of the second subchamber 627B remains unoccupied by the varistor assembly 650. The gap volume 627C is the space or volume extending radially between the varistor assembly 650 and the inner surface 622H of the sidewall 622B of the housing electrode 622. The void filling sleeve 636 occupies the gap volume 627C and surrounds the varistor assembly 650.

The receiver recesses or channels 636E and the bridge portions 660B, 662B of the interconnect members 660, 662 are relatively sized and assembled such that each of the bridge portions 660B, 662B is received and seated in a respective one of the receiver channels 636E. The remainder of the sleeve inner surface 636F generally conforms to the peripheral profiles of the varistor wafers 652, 654, 654.

Figure 17:
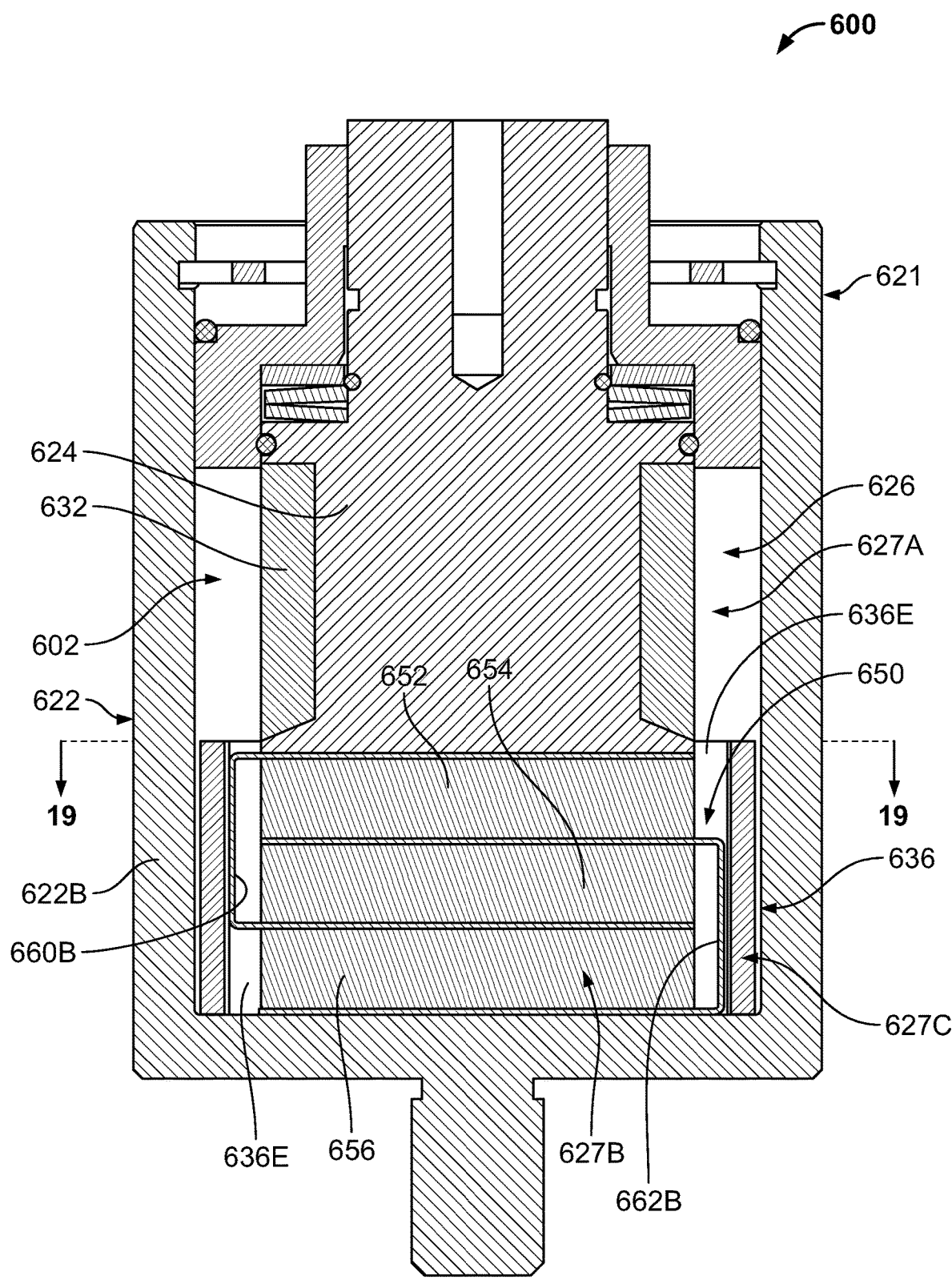
FIG. 17 is a cross-sectional view of an overvoltage protection device according further embodiments of the invention.
Figure 18:
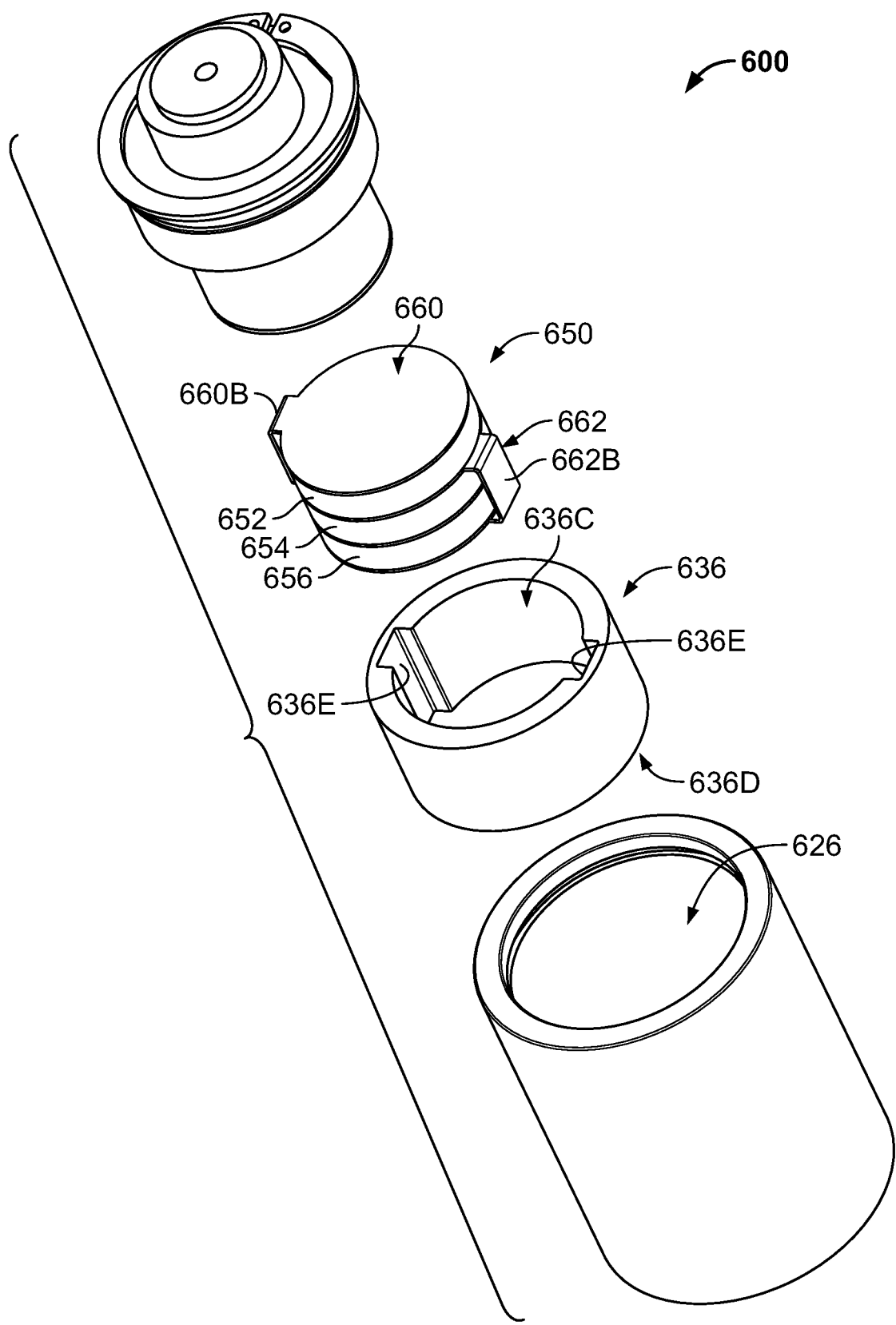
FIG. 18 is an exploded, perspective view of the overvoltage protection device of FIG. 17.
Figure 19:
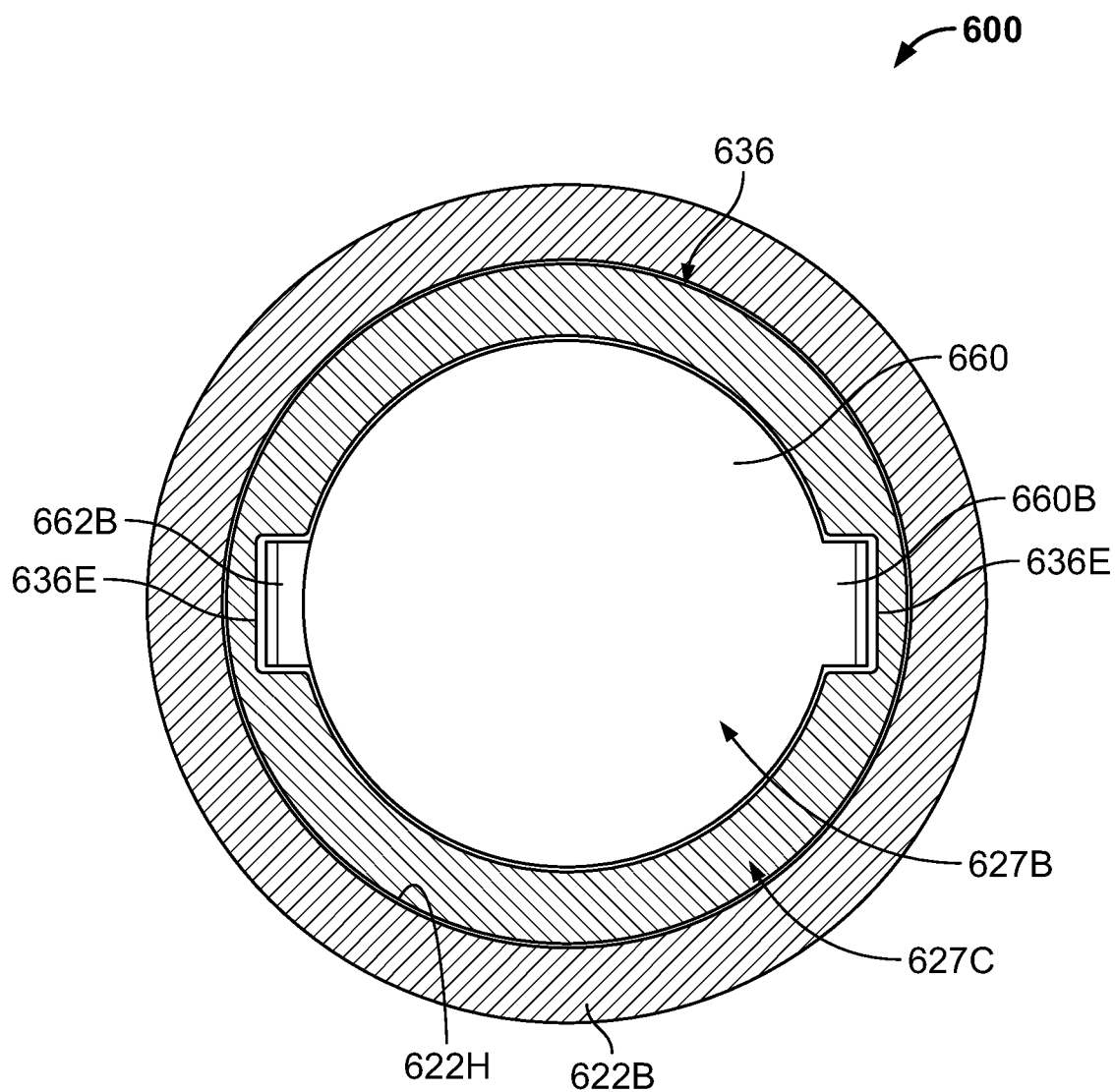
FIG. 19 is a cross-sectional view of the overvoltage protection device of FIG. 17 taken along the line 19-19 of FIG. 17.
Figure 20:
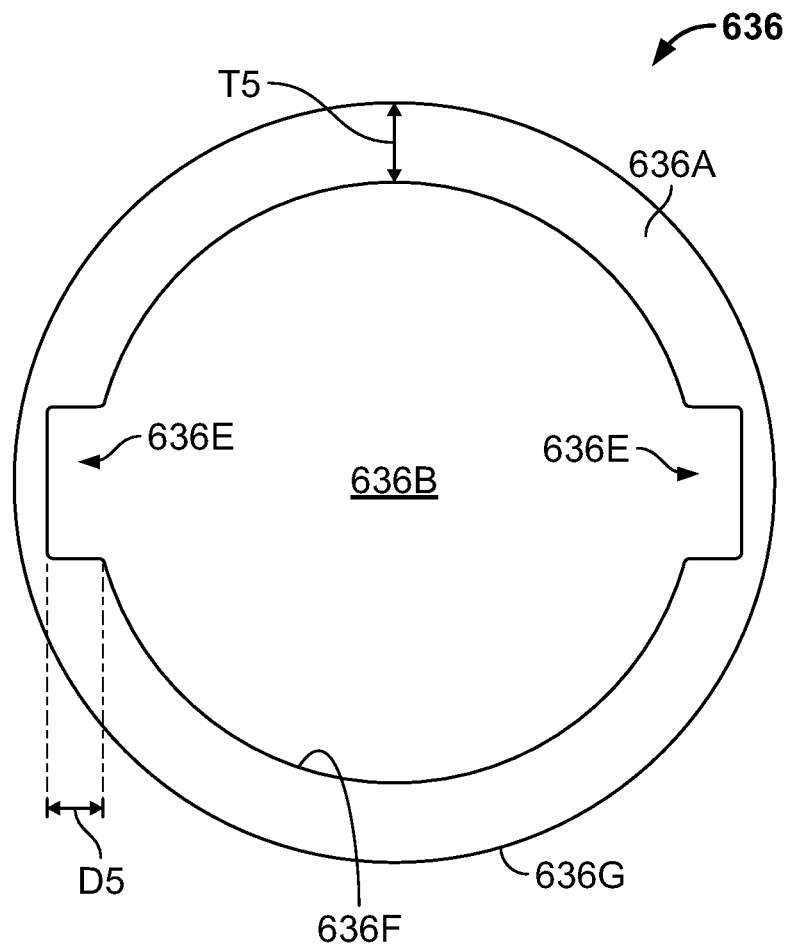
FIG. 20 is a top view of a void filling member forming a part of the overvoltage protection device of FIG. 17.

Thus, as can be appreciated from FIGS. 17 and 19, the inner surface 636F generally conforms to the outer shape of the varistor assembly 650. The cylindrical outer surface 636G generally conforms to the inner shape of the inner wall surface 622H of the housing electrode 622. In some embodiments, the gap between the inner surface 636F and the varistor wafers 652, 654, 654 is less than 2 mm. In some embodiments, the gap between the outer surface 636G and the inner wall surface 622H is less than 0.5 mm.

The varistor wafers 652, 654, 656 are relatively thick so that the overall height of the varistor assembly 650 is increased as compared to that of the varistor assembly 150, for example. As a result, the gap void or volume 627C surrounding the varistor assembly 650 is relatively large. Additionally, the bridge portions 660B, 662B project radially outwardly beyond the peripheral edges of the varistors 652, 654, 656. Because the inner surface 622H of the housing electrode 622 is cylindrical, the required spacing between the bridge portions 660B, 662B and the inner surface 622B creates relatively large gaps around the remainder of the varistor assembly 650.

In the absence of the void filling sleeve 636, this large gap volume 627C could compromise the intended operation of the meltable member 632 and the fail-safe mechanism 602. In particular, the volume of the melted meltable member 632 may not be sufficient to bridge the electrodes 622 and 624 to short circuit the electrodes 622, 624, depending on the orientation of the device 600 when the meltable member 632 is melted. The spacer sleeve 636 occupies the gap volume 627C and thereby reduces or limits the amount or volume of the meltable member 632 that can flow into the gap volume 627C when the meltable member 632 becomes molten. In this way, the void filling member 636 ensures that a greater and reliably sufficient quantity of the melted meltable member is retained in the first subchamber 627A to make simultaneous contact with the two electrodes 622, 624.

In some embodiments, the void filling sleeve 636 occupies at least 50 percent of the gap volume 627C and, in some embodiments, at least 80 percent. In some embodiments, the void filling sleeve 636 has a volume in the range of from about 100 mm$^3$ to 100,000 mm$^3$ and, in some embodiments, the volume is about 21,000 mm$^3$.

While the illustrated void filling member 636 is configured as a unitary, tubular sleeve having axially extending receiver channels 636E defined therein, other configurations and constructions may be employed. For example, the channels 636E may be replaced with radially extending bores that do not extend to the ends of the sleeve. The void filling member 636 may be replaced with two or more void filling members that are configured and arranged to occupy the gap volume 627C to the degree and with the dimensions discussed above. The two or more void filling members may be axially stacked and or may each surround the varistor assembly 650 by less than 360 degrees.

Figure 21:
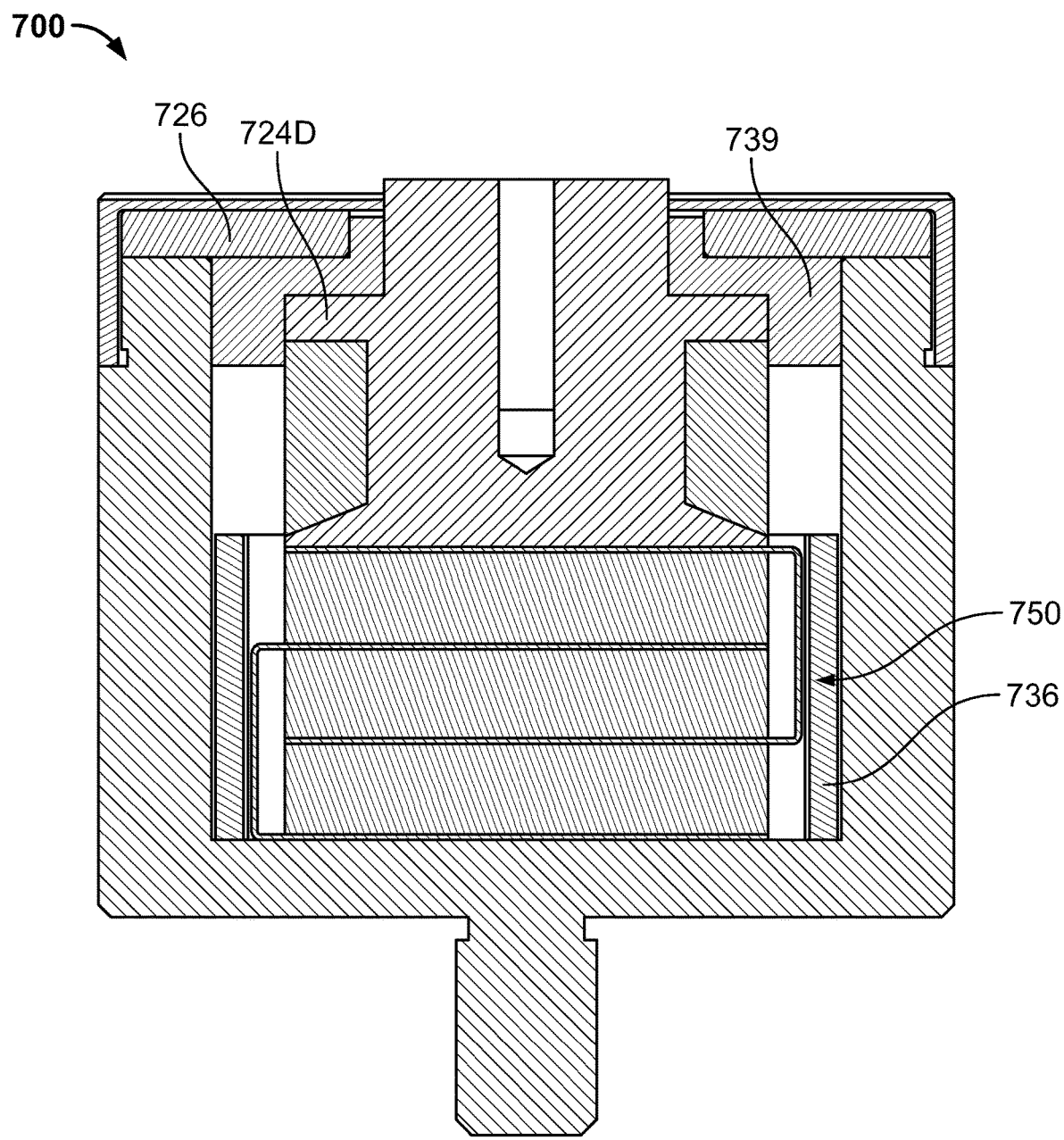
FIG. 21 is a cross-sectional view of an overvoltage protection device according further embodiments of the invention.

With reference to FIG. 21, a modular overvoltage protection device 700 according to further embodiments of the invention is shown therein. The overvoltage protection device 700 can be used in the same manner and for the same purpose as the overvoltage protection device 600. The overvoltage protection device 700 is constructed in the same manner as the overvoltage protection device 600, except as follows. The device 700 includes a varistor assembly 750 corresponding to the varistor assembly 650, and a void filling member 736 corresponding to the void filling member 636.

The overvoltage protection device 700 includes an elastomeric insulator member 739 corresponding to the elastomeric insulator member 239 (FIG. 12). The insulator member 739 is captured between the cover 726 and the electrode upper flange 724D and axially compressed (i.e., axially loaded and elastically deformed from its relaxed state) so that the insulator member 739 serves as a biasing member and applies a persistent axial pressure or load to the electrode 724 and the cover 726, as described with regard to the unit 200.

It will be appreciated that various aspects as disclosed herein can be used in different combinations. For example, an elastomeric insulator member corresponding to the elastomeric insulator member 239 can be used on place of the springs and end insulator members (e.g., insulator member 128C) of the overvoltage protection devices 100, 300, 400, 600. The varistor assemblies of each device 100-700 can be replaced with a varistor assembly of another one of the devices 100-700 (e.g., the five-wafer varistor assembly 350 or the two-wafer varistor assembly 450 can be used in place of the varistor assembly 650 in the device 600).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. An overvoltage protection device comprising:
   a first electrode member;
   a second electrode member;
   a varistor interposed between and electrically connected to each of the first and second electrode members;
   an electrically conductive meltable member, wherein the meltable member is responsive to heat in the overvoltage protection device to melt and form an electrical short circuit path across the first and second electrode members; and
   a void filling member surrounding at least a portion of the varistor, wherein the void filling member is formed of an electrically insulating material;
   wherein:
      the overvoltage protection device includes a sidewall defining a chamber, the chamber including a first subchamber and a second subchamber in fluid communication with the first subchamber;
      the meltable member is disposed in the first subchamber;
      the varistor is disposed in the second subchamber and a gap volume is defined between the varistor and the sidewall in the second subchamber; and
      the void filling member is disposed in the gap volume to limit a flow of the meltable member into the gap volume.

2. The overvoltage protection device of claim 1 wherein the void filling member is formed of an electrically insulating ceramic.

3. The overvoltage protection device of claim 1 wherein the void filling member occupies at least 50 percent of the gap volume.

4. The overvoltage protection device of claim 1 wherein the void filling member includes a tubular void filling sleeve that surrounds the varistor wafer.

5. The overvoltage protection device of claim 4 wherein:
   the void filling sleeve includes an inner surface that generally conforms to an outer shape of the varistor; and
   the void filling sleeve includes an outer surface that generally conforms to the shape of an inner wall surface of the sidewall.

6. The overvoltage protection device of claim 5 wherein:
   a gap between the inner surface of the void filling sleeve and the varistor is less than 2 mm; and
   a gap between the outer surface of the void filling sleeve and the inner wall surface of the sidewall is less than 0.5 mm.

7. The overvoltage protection device of claim 4 wherein the void filling sleeve includes a sleeve side wall having a nominal thickness of at least 2 mm.

8. The overvoltage protection device of claim 4 wherein the void filling sleeve is unitary.

9. The overvoltage protection device of claim 1 wherein:
   the varistor is a first varistor wafer;
   the overvoltage protection device includes:
      a second varistor wafer formed of a varistor material; and
      an electrically conductive interconnect member connecting the first and second varistor wafers in electrical parallel between the first and second electrode members;
      wherein the first and second varistor wafers are axially stacked between the first and second electrode members;
      the void filling member includes a receiver recess; and
      a portion of the interconnect member extends outwardly beyond the first and second varistor wafers and is disposed in the receiver recess.

10. The overvoltage protection device of claim 9 wherein the receiver recess is an axially extending channel defined in an inner surface of the void filling member.

11. The overvoltage protection device of claim 9 wherein the receiver recess has a depth in the range of from about 1 to 12 mm.

12. The overvoltage protection device of claim 1 wherein the void filling member is formed of a thermoplastic.

13. The overvoltage protection device of claim 1 wherein the void filling member is formed of a material having a melting point in the range of from about 120 to 200° C.

14. The overvoltage protection device of claim 1 wherein the void filling member is formed of a material that can withstand a voltage of 25 kV per mm of thickness.

15. The overvoltage protection device of claim 1 wherein the void filling member has a volume in the range of from about 100 mm$^3$ to 100,000 mm$^3$.

16. The overvoltage protection device of claim 1 wherein:
   the first electrode member includes a housing electrode including the sidewall and an end wall integral with the sidewall;
   the sidewall and the end wall collectively define the chamber;
   the second electrode member extends into the chamber; and
   the housing electrode is unitarily formed of metal.

17. The overvoltage protection device of claim 16 wherein the meltable member is mounted on the second electrode.

18. The overvoltage protection device of claim 1 wherein:
   the void filling member occupies at least 50 percent of the gap volume;
   the void filling member includes a tubular void filling sleeve that surrounds the varistor wafer;
   the void filling sleeve includes an inner surface that generally conforms to an outer shape of the varistor;
   the void filling sleeve includes an outer surface that generally conforms to the shape of an inner wall surface of the sidewall;
   the void filling sleeve includes a sleeve side wall having a nominal thickness of at least 2 mm; and
   the void filling member is formed of an electrically insulating ceramic.

19. The overvoltage protection device of claim 18 wherein:
   a gap between the inner surface of the void filling sleeve and the varistor is less than 2 mm; and
   a gap between the outer surface of the void filling sleeve and the inner wall surface of the sidewall is less than 0.5 mm.

20. The overvoltage protection device of claim 18 wherein:
   the first electrode member includes a housing electrode including the sidewall and an end wall integral with the sidewall;

the sidewall and the end wall collectively define the chamber;

the second electrode member extends into the chamber; and the housing electrode is unitarily formed of metal.

* * * * *